United States Patent
Hendry

(10) Patent No.: US 12,382,054 B2
(45) Date of Patent: Aug. 5, 2025

(54) MULTILAYER-BASED IMAGE CODING METHOD IN VIDEO OR IMAGE CODING SYSTEM

(71) Applicant: LG Electronics Inc., Seoul (KR)

(72) Inventor: Hendry Hendry, Seoul (KR)

(73) Assignee: LG Electronics Inc., Seoul (KR)

( * ) Notice: Subject to any disclaimer, the term of this patent is extended or adjusted under 35 U.S.C. 154(b) by 258 days.

(21) Appl. No.: 17/923,810

(22) PCT Filed: May 25, 2021

(86) PCT No.: PCT/KR2021/006505
§ 371 (c)(1),
(2) Date: Nov. 7, 2022

(87) PCT Pub. No.: WO2021/241986
PCT Pub. Date: Dec. 2, 2021

(65) Prior Publication Data
US 2023/0179769 A1    Jun. 8, 2023

Related U.S. Application Data

(60) Provisional application No. 63/029,700, filed on May 25, 2020.

(51) Int. Cl.
*H04N 19/132* (2014.01)
*H04N 19/176* (2014.01)

(52) U.S. Cl.
CPC ......... *H04N 19/132* (2014.11); *H04N 19/176* (2014.11)

(58) Field of Classification Search
CPC .. H04N 19/105; H04N 19/132; H04N 19/176; H04N 19/187; H04N 19/31; H04N 19/70
See application file for complete search history.

(56) References Cited

U.S. PATENT DOCUMENTS

| 2021/0306671 A1* | 9/2021 | Chen | H04N 19/132 |
| 2023/0106804 A1* | 4/2023 | Wang | H04N 19/136 |
| | | | 375/240.02 |

FOREIGN PATENT DOCUMENTS

| KR | 20140090566 | 7/2014 |
| KR | 20140092198 | 7/2014 |
| KR | 20150081229 | 7/2015 |
| WO | WO2015138979 | 9/2015 |

OTHER PUBLICATIONS

Hendry, "AHG8/AHG9: On HRD structure and OLS mapping signalling in VPS," JVET-R0195, Presented at Joint Video Experts Team (JVET) of ITU-T SG 16 WP 3 and ISO/IEC JTC 1/SC 29/WG 11, 18th Meeting: by teleconference, Apr. 15-24, 2020, 4 pages.

* cited by examiner

*Primary Examiner* — Dakshesh D Parikh
(74) *Attorney, Agent, or Firm* — Fish & Richardson P.C.

(57) ABSTRACT

An image decoding method performed by a decoding apparatus, according to the disclosure of the present document, comprises the steps of: obtaining, from a bitstream, image information including information related to a temporal sublayer and information related to a target OLS; generating prediction samples of a current block by performing prediction on the current block on the basis of the information related to the temporal sublayer; and generating a reconstructed picture on the basis of the prediction samples.

12 Claims, 12 Drawing Sheets

MULTILAYER-BASED IMAGE CODING METHOD IN VIDEO OR IMAGE CODING SYSTEM

CROSS-REFERENCE TO RELATED APPLICATIONS

This application is a National Stage application under 35 U.S.C. § 371 of International Application No. PCT/KR2021/006505, filed on May 25, 2021, which claims the benefit of U.S. Provisional Application No. 63/029,700, filed on May 25, 2020. The disclosures of the prior applications are incorporated by reference in their entirety.

BACKGROUND OF THE DISCLOSURE

Field of the Disclosure

The present document relates to a video/image coding technique and, more particularly, to a multilayer-based image coding method in a video or image coding system.

Related Art

Recently, the demand for high resolution, high quality image/video such as 4K or 8K Ultra High Definition (UHD) image/video is increasing in various fields. As the image/video resolution or quality becomes higher, relatively more amount of information or bits are transmitted than for conventional image/video data. Therefore, if image/video data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual image/video, such as game images/videos, are also growing.

Therefore, a highly efficient image/video compression technique is required to effectively compress and transmit, store, or play high resolution, high quality images/videos showing various characteristics as described above.

SUMMARY OF THE DISCLOSURE

An exemplary embodiment of the present document provides a method and an apparatus for enhancing video/image coding efficiency.

An exemplary embodiment of the present document provides a method and an apparatus for signaling information on the maximum number of temporal sublayers.

An exemplary embodiment of the present document provides a method and an apparatus for determining information on the maximum number of temporal sublayers based on the number of layers included in a target OLS.

An exemplary embodiment of the present document provides a video/image decoding method performed by a decoding apparatus.

An exemplary embodiment of the present document provides a decoding apparatus for performing a video/image decoding.

An exemplary embodiment of the present document provides a video/image encoding method performed by an encoding apparatus.

An exemplary embodiment of the present document provides an encoding apparatus for performing video/image encoding.

An exemplary embodiment of the present document provides a computer readable digital storage medium in which encoded video/image information generated by the video/image encoding method disclosed in at least one of the exemplary embodiments of the present document is stored.

An exemplary embodiment of the present document provides a computer readable digital storage medium in which encoded information or encoded video/image information causing the video/image decoding method disclosed in at least one of the exemplary embodiments of the present document to be performed by the decoding apparatus is stored.

According to an exemplary embodiment of the present document, it is possible to enhance overall image/video compression efficiency.

According to an exemplary embodiment of the present document, it is possible to signal information on the maximum number of temporal sublayers.

According to an exemplary embodiment of the present document, it is possible to determine information on the maximum number of temporal sublayers based on the number of layers included in a target OLS.

DESCRIPTION OF EXEMPLARY EMBODIMENTS

Figure 1:
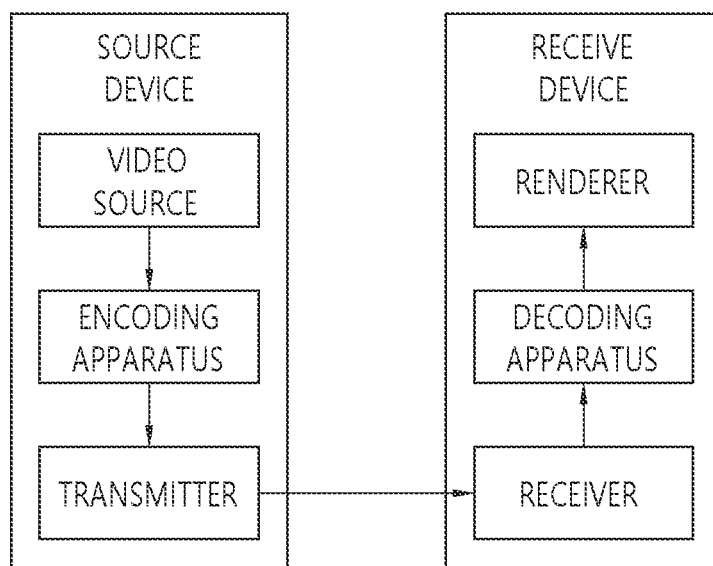
FIG. 1 schematically illustrates an example of a video/image coding system to which exemplary embodiments of the present document are applicable.

This document may be modified in various forms, and specific embodiments thereof will be described and shown in the drawings. However, the embodiments are not intended for limiting this document. The terms used in the following description are used to merely describe specific embodiments, but are not intended to limit this document. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, each of the components in the drawings described in this document are shown independently for the convenience of description regarding different characteristic functions, and do not mean that the components are implemented in separate hardware or separate software. For example, two or more of each configuration may be combined to form one configuration, or one configuration may be divided into a plurality of configurations. Embodiments in which each configuration is integrated and/or separated are also included in the scope of this document without departing from the spirit of this document.

Hereinafter, exemplary embodiments of this document will be described in detail with reference to the accompanying drawings. Hereinafter, the same reference numerals are used for the same components in the drawings, and redundant description of the same components may be omitted.

FIG. 1 schematically illustrates an example of a video/image coding system to which exemplary embodiments of the present document are applicable.

Referring to FIG. 1, a video/image coding system may include a first apparatus (a source device) and a second apparatus (a receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

The present document relates to a video/image coding. For example, methods/exemplary embodiments disclosed in the present document are applicable to a method disclosed in a versatile video coding (VVC) standard. Further, the methods/exemplary embodiments disclosed in the present document are applicable to a method disclosed in an essential video coding (EVC) standard, an AOMedia Video 1 (AV1) standard, a 2nd generation of audio video coding (AVS2) standard, or a next-generation video/image coding standard (e.g., H.267 or H.268).

This document presents various embodiments of video/image coding, and the embodiments may be performed in combination with each other unless otherwise mentioned.

In the present document, a video may mean a group of a series of images over time. A picture generally means a unit representing one image in a specific time period, and a slice and a tile are units constituting a part of a picture in coding. The slice/tile may include one or more coding tree units (CTUs). One picture may be composed of one or more slices/tiles. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of complete tiles or an integer number of consecutive complete CTU rows within a tile of a picture that may be exclusively contained in a single NAL unit.

Meanwhile, one picture may be divided into two or more subpictures. The subpicture may be a rectangular region of one or more slices within a picture.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (e.g., Cb, cr) blocks. The unit may be used interchangeably with terms such as block or area in some cases. In a general case, an M×N block may include samples (or sample arrays) or a set (or array) of transform coefficients of M columns and N rows.

In the present document, "A or B" may mean "only A", "only B", or "both A and B". In other words, in the present document, "A or B" may be interpreted as "A and/or B". For example, in the present document, "A, B, or C" may mean "only A", "only B", "only C", or "any combination of A, B, and C".

A slash (/) or a comma used in the present document may mean "and/or". For example, "A/B" may mean "A and/or B". Therefore, "A/B" may mean "only A", "only B", or "both A and B". For example, "A, B, C" may mean "A, B, or C".

In the present document, "at least one of A and B" may mean "only A", "only B", or "both A and B". Further, in the present document, expressions of "at least one of A or B" or "at least one of A and/or B" may be interpreted the same as "at least one of A and B".

Further, in the present document, "at least one of A, B, and C" may mean "only A", "only B", "only C", or "any combination of A, B, and C". Further, "at least one of A, B, or C" or "at least one of A, B, and/or C" may mean "at least one of A, B, and C".

Further, a parenthesis used in the present document may mean "for example". Specifically, if it is indicated by a "prediction (intra prediction)", an "intra prediction" may be proposed as an example of the "prediction". In other words, the "prediction" in the present document is not limited to the "intra prediction", and the "intra prediction" may be proposed as the example of the "prediction". Further, even if it is indicated by a "prediction (i.e., intra prediction)", the "intra prediction" may be proposed as the example of the "prediction".

In the present document, a technical feature individually described in one drawing may also be individually implemented, and also be simultaneously implemented.

Figure 2:
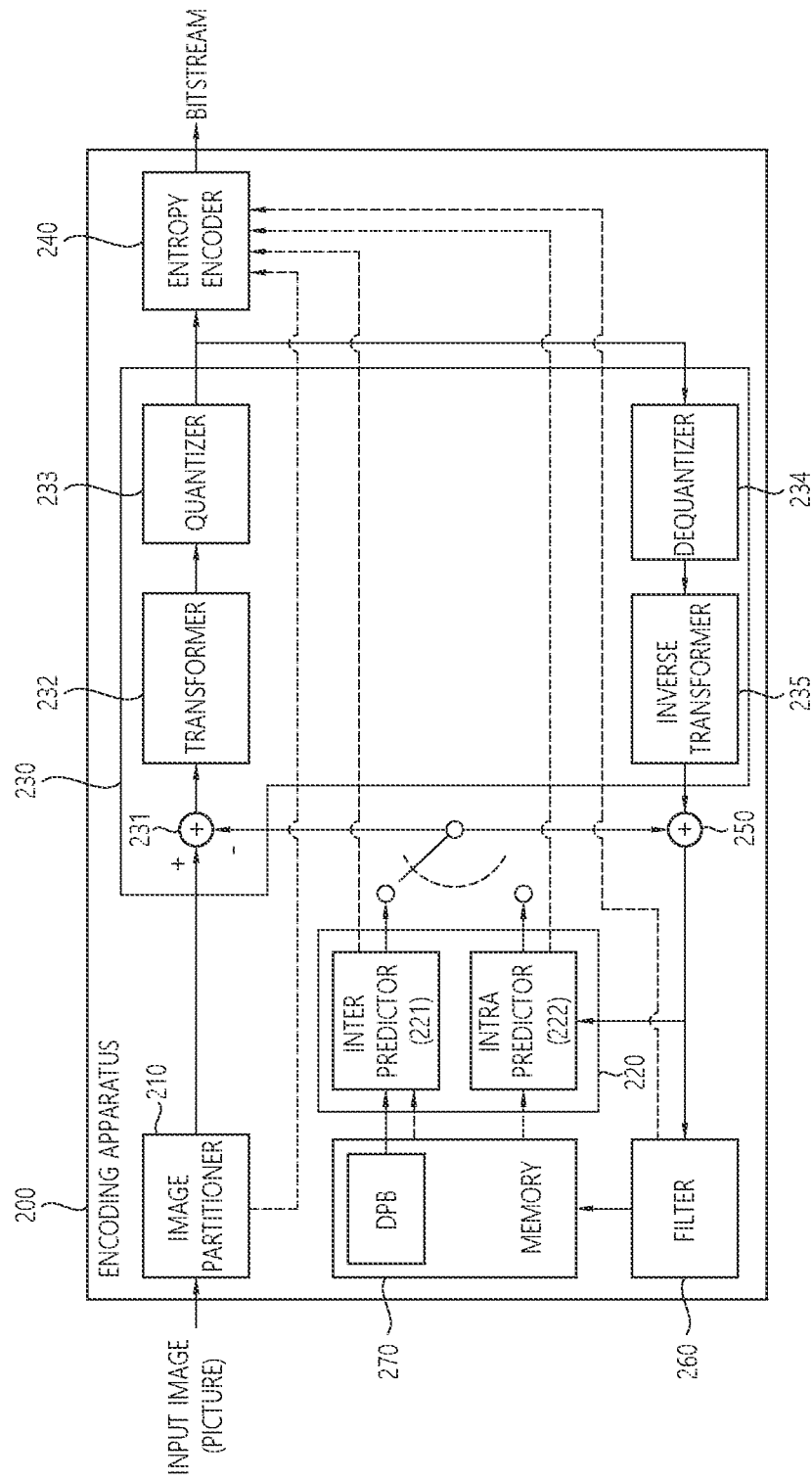
FIG. 2 schematically illustrates a configuration of a video/image encoding apparatus to which exemplary embodiments of the present document are applicable.

FIG. 2 schematically illustrates a configuration of a video/image encoding apparatus to which exemplary embodiments of the present document are applicable. Hereinafter, the encoding apparatus may include an image encoding apparatus and/or a video encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (e.g., an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to this document may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a part for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various kinds of information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (e.g., values of syntax elements, etc.) together or separately. Encoded information (e.g., encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In this document, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various kinds of information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Meanwhile, image/video coding according to the present disclosure may include multilayer-based image/video coding. The multilayer-based image/video coding may include scalable coding. The multilayer-based coding or scalable coding may process input signals for each layer. Input signals (input image/picture) may differ in at least one of resolution, frame rate, bit-depth, color format, aspect ratio, and view depending on the layers. In this case, it is possible to reduce repeated transmission/processing of information and increase compression efficiency by performing prediction between layers using a difference between layers, namely, based on scalability.

Figure 3:
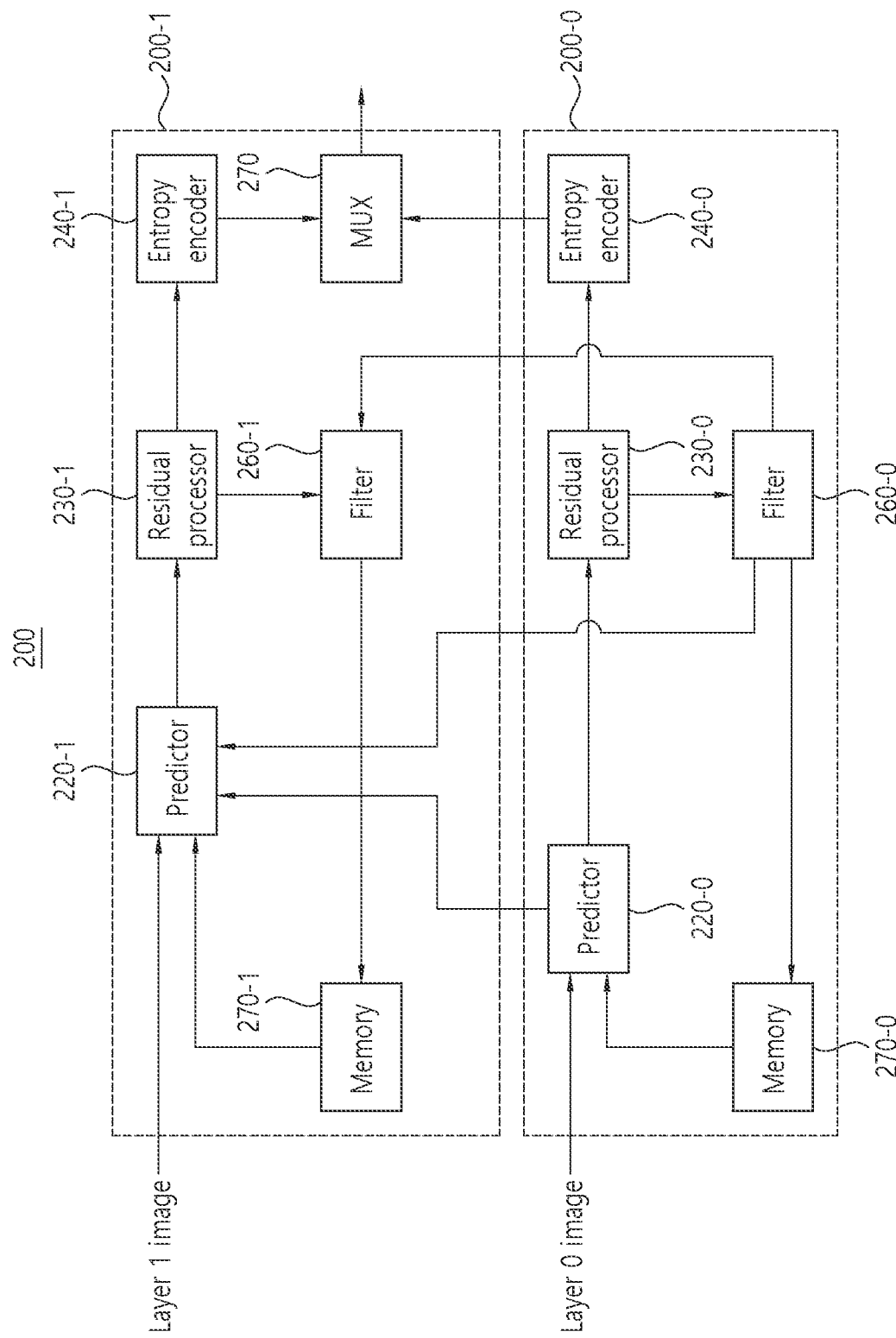
FIG. 3 schematically illustrates a configuration of a multilayer-based video/image encoding apparatus to which exemplary embodiments of the present document are applicable.

FIG. 3 schematically illustrates a configuration of a multilayer-based video/image encoding apparatus to which exemplary embodiments of the present document are applicable. The encoding apparatus of FIG. 3 may include the encoding apparatus of FIG. 2. Although an image practitioner and an adder are omitted in FIG. 3, the encoding apparatus may include an image practitioner and an adder. In this case, the image practitioner and the adder may be included by a unit of a layer. A description of this drawing focuses on multilayer-based prediction. Hereinafter, a multilayer may be interchangeably used with a multiple layer.

In FIG. 3, for convenience of description, a multilayer structure including two layers is described for illustration. However, exemplary embodiments of the present document are not limited to this structure, and a multilayer structure to which an exemplary embodiment of the present document is applied may include two or more layers.

Referring to FIG. 3, the encoding apparatus 200 includes an encoder 200-1 for layer 1 and an encoder 200-0 for layer 0.

Layer 0 may be a base layer, a reference layer, or a lower layer; layer 1 may be an enhancement layer, a current layer, or a higher layer.

The encoder 200-1 of layer 1 includes a predictor 220-1, a residual processor 230-1, a filter 260-1, a memory 270-1, an entropy encoder 240-1, and a multiplexer (MUX) 270. The MUX may be included as an external component.

The encoder 200-0 of layer 0 includes a predictor 220-0, a residual processor 230-0, a filter 260-0, a memory 270-0, and an entropy encoder 240-0.

The predictor 220-0, 220-1 may perform prediction on the input image based on various prediction techniques as described above. For example, the predictor 220-0, 220-1 may perform inter prediction and intra prediction. The predictor 220-0, 220-1 may perform prediction in predetermined processing units. A prediction unit may be a coding unit (CU) or a transform unit (TU). A predicted block (including prediction samples) may be generated according to a prediction result, and the residual processor may derive a residual block (including residual samples) based on the predicted block.

Through inter prediction, a prediction block may be generated by performing prediction based on the information on at least one of a preceding picture and/or a succeeding picture of the current picture. Through intra prediction, a prediction block may be generated by performing prediction based on neighboring samples within the current picture.

Various prediction mode methods described above may be used for an inter prediction mode or method. Inter prediction may select a reference picture with respect to a current block to be predicted and a reference block related to the current block within the reference picture. The predictor 220-0, 220-1 may generate a predicted block based on the reference block.

Also, the predictor 320-1 may perform prediction on layer 1 using the information of layer 0. In the present disclosure, a method of predicting information of a current layer using the information of another layer is referred to as inter-layer prediction for the convenience of description.

Information of the current layer predicted based on the information of another layer (i.e., predicted by inter-layer prediction) includes at least one of texture, motion information, unit information, and predetermined parameters (e.g., filtering parameters).

Also, information of another layer used for prediction of the current layer (i.e., used for inter-layer prediction) may include at least one of texture, motion information, unit information, and predetermined parameters (e.g., filtering parameters).

In inter-layer prediction, a current block may be a block in a current picture in a current layer (e.g., layer 1), and may be a block to be coded. A reference block may be a block in a picture (reference picture) belonging to the same access unit (AU) as the picture (current picture) to which the current block belongs in a layer referenced (reference layer, for example, layer 0) for prediction of the current block, and may be a block corresponding to the current block.

One example of inter-layer prediction is inter-layer motion prediction that predicts motion information of a current layer using motion information of a reference layer. According to inter-layer motion prediction, motion information of a current block may be predicted based on the motion information of a reference block. In other words, in deriving motion information based on the inter prediction mode to be described later, a motion information candidate may be derived using the motion information of an inter-layer reference block instead of a temporal neighboring block.

When inter-layer motion prediction is applied, the predictor 220-1 may scale and use the reference block (i.e., inter-layer reference block) motion information of the reference layer.

In another example of inter-layer prediction, inter-layer texture prediction may use the texture of a reconstructed reference block as a prediction value for the current block. In this case, the predictor 220-1 may scale the texture of the reference block through upsampling. Inter-layer texture prediction may be called inter-layer (reconstructed) sample prediction or simply inter-layer prediction.

In inter-layer parameter prediction, which is yet another example of inter-layer prediction, a parameter derived from the reference layer may be reused in the current layer, or a parameter for the current layer may be derived based on the parameter used in the reference layer.

In inter-layer residual prediction, which is still another example of inter-layer prediction, residuals of the current layer may be predicted using residual information of another layer, and prediction for the current block may be performed based on the predicted residuals.

In inter-layer differential prediction, which is yet still another example of inter-layer prediction, prediction for the current block may be performed using a difference between images obtained by upsampling or downsampling of a reconstructed picture of the current layer and a reconstructed picture of the reference layer.

In inter-layer syntax prediction, which is still yet another example of inter-layer prediction, the texture of a current block may be predicted or generated using syntax information of the reference layer. In this case, the syntax information of the referenced reference layer may include information on the intra prediction mode and motion information.

When predicting a specific block, a plurality of prediction methods using the inter-layer prediction may use multiple layers.

Here, as examples of inter-layer prediction, inter-layer texture prediction, inter-layer motion prediction, inter-layer unit information prediction, inter-layer parameter prediction, inter-layer residual prediction, inter-layer differential prediction, and inter-layer syntax prediction have been described; however, inter-layer prediction applicable to the present disclosure is not limited to the examples above.

For example, inter-layer prediction may be applied as an extension of inter prediction for the current layer. In other words, inter prediction for the current block may be performed by including a reference picture derived from the reference layer in the reference pictures that may be referenced for inter prediction of the current block.

In this case, the inter-layer reference picture may be included in a reference picture list for the current block. Using the inter-layer reference picture, the predictor 320-1 may perform inter prediction on the current block.

Here, the inter-layer reference picture may be a reference picture constructed by sampling a reconstructed picture of the reference layer to correspond to the current layer. Therefore, when the reconstructed picture of the reference layer corresponds to a picture of the current layer, the reconstructed picture of the reference layer may be used as the inter-layer reference picture without sampling. For example, when the width and height of samples in a reconstructed picture of the reference layer are the same as those of samples in a reconstructed picture of the current layer; and the offsets between the upper left, upper right, lower left, and lower right of a picture of the reference layer and the upper left, upper right, lower left, and lower right of a picture of the current layer are 0, the reconstructed picture of the reference layer may be used as the inter-layer reference picture of the current layer without re-sampling.

Also, the reconstructed picture of the reference layer from which the inter-layer reference picture is derived may be a picture belonging to the same AU as the current picture to be encoded.

When inter prediction for the current block is performed by including an inter-layer reference picture in the reference picture list, the positions of the inter-layer reference picture within the reference picture list L0 and L1 may be different from each other. For example, in the case of the reference picture list L0, the inter-layer reference picture may be located after short-term reference pictures before the current picture, and in the case of the reference picture list L1, the inter-layer reference picture may be located at the end of the reference picture list.

Here, the reference picture list L0 is a reference picture list used for inter prediction of a P slice or a reference picture list used as a first reference picture list in inter prediction of a B slice. The reference picture list L1 is a second reference picture list used for inter prediction of a B slice.

Therefore, the reference picture list L0 may be composed in the order of a short-term reference picture(s) before the current picture, an inter-layer reference picture, a short-term reference picture(s) after the current picture, and a long-term reference picture. The reference picture list L1 may be composed in the order of a short-term reference picture(s) after the current picture, a short-term reference picture(s) before the current picture, a long-term reference picture, and an inter-layer reference picture.

At this time, a predictive slice (P slice) is a slice on which intra prediction is performed or inter prediction is performed using up to one motion vector and reference picture index per prediction block. A bi-predictive slice (B slice) is a slice on which intra prediction is performed, or prediction is performed using up to two motion vectors and reference picture indexes per prediction block. In this regard, an intra slice (I slice) is a slice to which only intra prediction is applied.

Also, when inter prediction for the current block is performed based on the reference picture list including an inter-layer reference picture, the reference picture list may include a plurality of inter-layer reference pictures derived from a plurality of layers.

When the reference picture list includes a plurality of inter-layer reference pictures, inter-layer reference pictures may be cross-arranged within the reference picture list L0 and L1. For example, suppose that two inter-layer reference pictures, an inter-layer reference picture $ILRP_i$, and an inter-layer reference picture $ILRP_j$ are included in the reference picture list used for inter prediction of the current block. In this case, in the reference picture list L0, $ILRP_i$ may be located after short-term reference pictures before the current picture, and $ILRP_j$ may be located at the end of the list. Also, in the reference picture list L1, $ILRP_i$ may be located at the end of the list, and $ILRP_j$ may be located after short-term reference pictures after the current picture.

In this case, the reference picture list L0 may be composed in the order of the short-term reference picture(s) before the current picture, the inter-layer reference picture $ILRP_i$, the short-term reference picture(s) after the current picture, the long-term reference picture, and the inter-layer reference picture $ILRP_j$. The reference picture list L1 may be composed in the order of the short-term reference picture(s) after the current picture, the inter-layer reference picture $ILRP_j$, the short-term reference picture(s) before the current picture, the long-term reference picture, and the inter-layer reference picture $ILRP_i$.

Also, one of the two inter-layer reference pictures may be an inter-layer reference picture derived from a scalable layer related to resolution, and the other may be an inter-layer reference picture derived from a layer providing a different view. In this case, for example, suppose $ILRP_i$ is an inter-layer reference picture derived from a layer that provides a different resolution, and $ILRP_j$ is an inter-layer reference picture derived from a layer that provides a different view. Then, in the case of scalable video coding that supports only scalability except for a view, the reference picture list L0 may be composed in the order of the short-term reference picture(s) before the current picture, the inter-layer reference picture $ILRP_i$, the short-term reference picture(s) after the current picture, and the long-term reference picture. On the other hand, the reference picture list L1 may be composed in the order of the short-term reference picture(s) after the current picture, the short-term reference picture(s) before the current picture, the long-term reference picture, and the inter-layer reference picture $ILRP_i$.

Meanwhile, for inter-layer prediction, the information of an inter-layer reference picture may be composed of only a sample value, only motion information (motion vector), or both the sample value and the motion information. When the reference picture index indicates the inter-layer reference picture, the predictor 220-1 uses only the sample value of the inter-layer reference picture, motion information (motion vector) of the inter-layer reference picture, or both of the sample value and the motion information of the inter-layer reference picture according to the information received from the encoding apparatus.

When only the sample values of the inter-layer reference picture are used, the predictor 220-1 may derive samples of a block specified by a motion vector in the inter-layer reference picture as prediction samples of the current block. In the case of scalable video coding that does not consider a view, the motion vector in inter prediction (inter-layer prediction) using the inter-layer reference picture may be set to a fixed value (for example, 0).

When only the motion information of an inter-layer reference picture is used, the predictor 220-1 may use a motion vector specified in the inter-layer reference picture as a motion vector predictor for deriving the motion vector of the current block. Also, the predictor 220-1 may use a motion vector specified in the inter-layer reference picture as the motion vector of the current block.

When both the samples and the motion information of the inter-layer reference picture are used, the predictor 220-1 may use the samples related to the current block in the inter-layer reference picture and the motion information (motion vector) specified in the inter-layer reference picture for prediction of the current block.

When inter-layer prediction is applied, the encoding apparatus may transmit a reference index indicating an inter-layer reference picture within the reference picture list to the decoding apparatus and also transmit, to the decoding apparatus, information that specifies which information (sample information, motion information, or sample information and motion information) to use from the inter-layer reference picture, namely, information that specifies dependency type of the dependency related to the inter-layer prediction between two layers.

Figure 4:
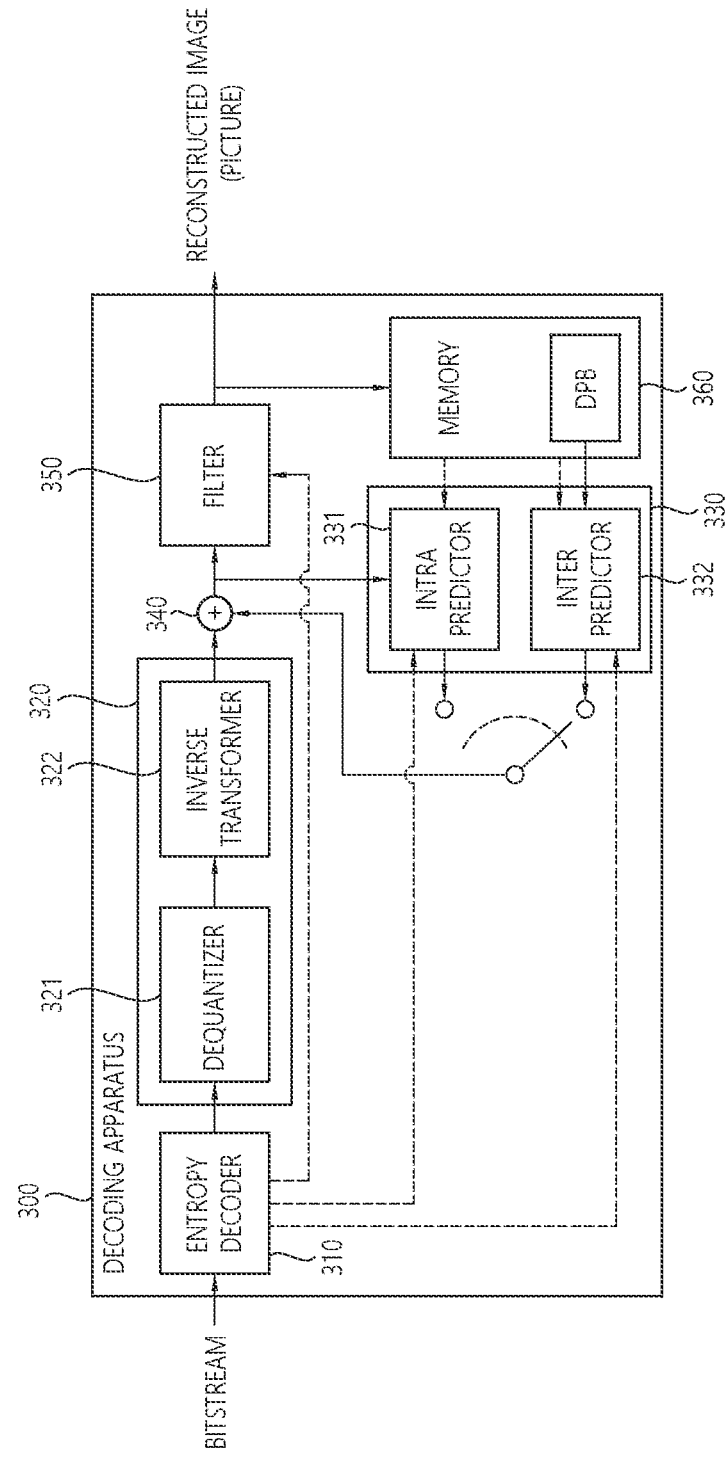
FIG. 4 schematically illustrates a configuration of a video/image decoding apparatus to which exemplary embodiments of the present document are applicable.

FIG. 4 schematically illustrates a configuration of a video/image decoding apparatus to which exemplary embodiments of the present document are applicable. Hereinafter, the decoding apparatus may include an image decoding apparatus and/or a video decoding apparatus.

Referring to FIG. 4, the decoding apparatus 300 may include an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (e.g., a decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to this document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (e.g., quantization step size information) and obtain transform coefficients.

The inverse transformer 322 inversely transforms the transform coefficients to obtain a residual signal (residual block, residual sample array).

The predictor 330 may perform prediction on the current block and generate a predicted block including prediction samples for the current block. The predictor 330 may determine whether intra prediction or inter prediction is applied to the current block based on the information on the prediction output from the entropy decoder 310 and may determine a specific intra/inter prediction mode.

The predictor 330 may generate a prediction signal based on various prediction methods described below. For example, the predictor 330 may not only apply intra prediction or inter prediction to predict one block but also simultaneously apply intra prediction and inter prediction. This may be called combined inter and intra prediction (CIIP). In addition, the predictor 330 may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block. The intra predictor 331 may predict the current block by referring to the samples in the current picture. The referenced samples may be located in the neighborhood of the current block or may be located apart according to the prediction mode. In intra prediction, prediction modes may include a plurality of non-directional modes and a plurality of directional modes. The intra predictor 331 may determine the prediction mode applied to the current block by using the prediction mode applied to the neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, prediction sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 332 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In this document, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the inter predictor 332 and the intra predictor 331.

As described above, in performing video coding, a prediction is performed to enhance compression efficiency. A predicted block including prediction samples for a current block, that is, a target coding block, may be generated through the prediction. In this case, the predicted block includes the prediction samples in a spatial domain (or pixel domain). The predicted block is identically derived in the encoding apparatus and the decoding apparatus. The encoding apparatus may enhance image coding efficiency by signaling, to the decoding apparatus, information on a residual (residual information) between the original block not an original sample value itself of the original block and the predicted block. The decoding apparatus may derive a residual block including residual samples based on the residual information, may generate a reconstructed including reconstructed samples by adding the residual block and the predicted block, and may generate a reconstructed picture including the reconstructed blocks.

The residual information may be generated through a transform and quantization procedure. For example, the encoding apparatus may derive the residual block between the original block and the predicted block, may derive transform coefficients by performing a transform procedure on the residual samples (residual sample array) included in the residual block, may derive quantized transform coefficients by performing a quantization procedure on the transform coefficients, and may signal related residual information to the decoding apparatus (through a bitstream). In this case, the residual information may include information, such as value information, location information, transform scheme, transform kernel, and quantization parameter of the quantized transform coefficients. The decoding apparatus may perform a dequantization/inverse transform procedure based on the residual information, and may derive residual samples (or residual block). The decoding apparatus may generate a reconstructed picture based on the predicted block and the residual block. Furthermore, the encoding apparatus may derive a residual block by dequantizing/inverse-transforming the quantized transform coefficients for reference to the inter prediction of a subsequent picture, and may generate a reconstructed picture.

In the present document, at least one of the quantization/the dequantization and/or the transform/the inverse transform may be omitted. If the quantization/dequantization are omitted, the quantized transform coefficient may be referred to as a transform coefficient. If the transform/the inverse transform are omitted, the transform coefficient may also be referred to as a coefficient or a residual coefficient, or for unity of expression, also be still referred to as the transform coefficient.

Further, in the present document, the quantized transform coefficient and the transform coefficient may be referred to as a transform coefficient and a scaled transform coefficient, respectively. In this case, the residual information may include information about the transform coefficient(s), and the information about the transform coefficient(s) may be signaled through a residual coding syntax. The transform coefficients may be derived based on the residual information (or the information about the transform coefficient(s)), and the scaled transform coefficients may be derived through the inverse transform (scaling) for the transform coefficients. The residual samples may be derived based on the inverse transform (transform) for the scaled transform coefficients. This may be likewise applied to/expressed in other parts of the present document.

Meanwhile, image/video decoding according to the present disclosure may include multilayer-based image/video coding. The multilayer-based image/video coding may include scalable coding. The multilayer-based coding or scalable coding may process input signals for each layer. Input signals (input image/picture) may differ in at least one of resolution, frame rate, bit-depth, color format, aspect ratio, and view depending on the layers. In this case, it is possible to reduce repeated transmission/processing of information and increase compression efficiency by performing prediction between layers using a difference between layers, namely, based on scalability.

Figure 5:
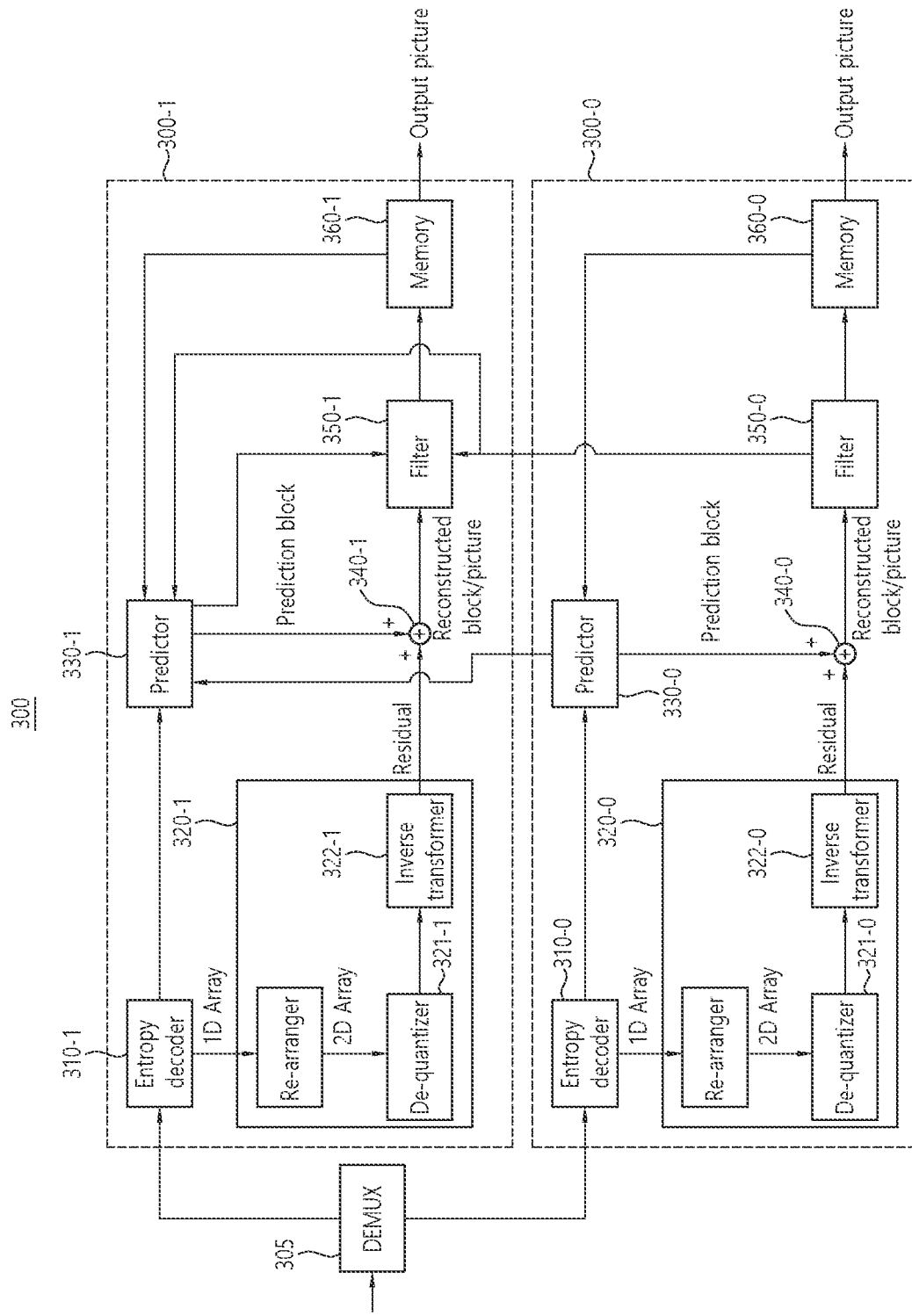
FIG. 5 schematically illustrates a configuration of a multilayer-based video/image decoding apparatus to which exemplary embodiments of the present document are applicable.

FIG. 5 schematically illustrates a configuration of a decoding apparatus for decoding a multilayer-based video/image signal to which exemplary embodiments of the present document are applicable. The decoding apparatus of FIG. 5 may include the decoding apparatus of FIG. 4. In FIG. 5, a rearranger may be omitted, or may be included in the dequantizer. A description of this drawing focuses on multilayer-based prediction.

In FIG. 5, for convenience of description, a multilayer structure including two layers is described for illustration. However, exemplary embodiments of the present document are not limited to this structure, and a multilayer structure to which an exemplary embodiment of the present document is applied may include two or more layers.

Referring to FIG. 5, the decoding apparatus 300 includes a decoder 300-1 for layer 1 and a decoder 300-0 for layer 0.

The decoder 300-1 of layer 1 may include an entropy decoder 310-1, a residual processor 320-1, a predictor 330-1, an adder 340-1, a filter 350-1 and a memory 360-1.

The decoder 300-0 of layer 0 may include an entropy decoder 310-0, a residual processor 320-0, a predictor 330-0, an adder 340-0, a filter 350-0 and a memory 360-0.

When a bitstream including image information is transmitted from the encoding apparatus, DEMUX 305 may demultiplex the information for each layer and deliver the information to the decoding apparatus for each layer.

The entropy decoder 310-1, 310-0 may perform decoding according to the coding method used in the encoding apparatus. For example, when CABAC is used in the encoding apparatus, the entropy decoder 310-1, 310-0 may also perform entropy decoding based on CABAC.

When the prediction mode for a current block is the intra prediction mode, the predictor 330-1, 330-0 may perform intra prediction on the current block based on neighboring reconstructed samples within the current picture.

When the prediction mode for the current block is an inter prediction mode, the predictor 330-1, 330-0 may perform inter prediction on the current block based on the information included in at least one of a picture before the current picture or a picture after the current picture. The information received from the encoding apparatus may be checked, and part or all of the motion information required for inter prediction may be derived based on the checked information.

When the skip mode is applied as the inter prediction mode, residuals may not be transmitted from the encoding apparatus, and the prediction block may be used as a reconstructed block.

Meanwhile, the predictor 330-1 of layer 1 may perform inter prediction or intra prediction using only the information within layer 1 or may perform inter-layer prediction using the information of another layer (layer 0).

Information of the current layer predicted using the information of a different layer (i.e., predicted by inter-layer prediction) includes at least one of texture, motion information, unit information, and predetermined parameters (e.g., filtering parameters).

Also, information of the different layer used for prediction of the current layer (i.e., used for inter-layer prediction) may include at least one of texture, motion information, unit information, and predetermined parameters (e.g., filtering parameters).

In inter-layer prediction, a current block may be a block within the current picture of a current layer (e.g., layer 1) and may be a target block to be decoded. A reference block may be a block within a picture (reference picture) belonging to the same access unit (AU) as the picture (current picture) to which the current block belongs in a layer (reference layer, for example, layer 0) referenced for prediction of the current block and may be a block corresponding to the current block.

One example of inter-layer prediction is inter-layer motion prediction that predicts motion information of a current layer using motion information of a reference layer. According to inter-layer motion prediction, motion information of a current block may be predicted based on the motion information of a reference block. In other words, in deriving motion information based on the inter prediction mode to be described later, a motion information candidate may be derived using the motion information of an inter-layer reference block instead of a temporal neighboring block.

When inter-layer motion prediction is applied, the predictor 330-1 may scale and use the reference block (i.e., inter-layer reference block) motion information of the reference layer.

In another example of inter-layer prediction, inter-layer texture prediction may use the texture of a reconstructed reference block as a prediction value for the current block. In this case, the predictor 330-1 may scale the texture of the reference block through upsampling. Inter-layer texture prediction may be called inter-layer (reconstructed) sample prediction or simply inter-layer prediction.

In inter-layer parameter prediction, which is yet another example of inter-layer prediction, a parameter derived from the reference layer may be reused in the current layer, or a parameter for the current layer may be derived based on the parameter used in the reference layer.

In inter-layer residual prediction, which is still another example of inter-layer prediction, residuals of the current layer may be predicted using residual information of another layer, and prediction for the current block may be performed based on the predicted residuals.

In inter-layer differential prediction, which is yet still another example of inter-layer prediction, prediction for the current block may be performed using a difference between images obtained by upsampling or downsampling of a reconstructed picture of the current layer and a reconstructed picture of the reference layer.

In inter-layer syntax prediction, which is still yet another example of inter-layer prediction, the texture of a current block may be predicted or generated using syntax information of the reference layer. In this case, the syntax information of the referenced reference layer may include information on the intra prediction mode and motion information.

When predicting a specific block, a plurality of prediction methods using the inter-layer prediction may use multiple layers.

Here, as examples of inter-layer prediction, inter-layer texture prediction, inter-layer motion prediction, inter-layer unit information prediction, inter-layer parameter prediction, inter-layer residual prediction, inter-layer differential prediction, and inter-layer syntax prediction have been described; however, inter-layer prediction applicable to the present disclosure is not limited to the examples above.

For example, inter-layer prediction may be applied as an extension of inter prediction for the current layer. In other words, inter prediction for the current block may be performed by including a reference picture derived from the reference layer in the reference pictures that may be referenced for inter prediction of the current block.

When the reference picture index received from the encoding apparatus or the reference picture index derived from neighboring blocks indicates an inter-layer reference picture within the reference picture list, the predictor 330-1 may perform inter-layer prediction using the inter-layer reference picture. For example, when the reference picture index indicates the inter-layer reference picture, the predictor 330-1 may derive sample values of a region specified by a motion vector in the inter-layer reference picture as a prediction block for the current block.

In this case, the inter-layer reference picture may be included in a reference picture list for the current block. Using the inter-layer reference picture, the predictor 530-1 may perform inter prediction on the current block.

Here, the inter-layer reference picture may be a reference picture constructed by sampling a reconstructed picture of the reference layer to correspond to the current layer. Therefore, when the reconstructed picture of the reference layer corresponds to a picture of the current layer, the reconstructed picture of the reference layer may be used as the inter-layer reference picture without sampling. For example, when the width and height of samples in a reconstructed picture of the reference layer are the same as those of samples in a reconstructed picture of the current layer; and the offsets between the upper left, upper right, lower left, and lower right of a picture of the reference layer and the upper left, upper right, lower left, and lower right of a picture of the current layer are 0, the reconstructed picture of the reference layer may be used as the inter-layer reference picture of the current layer without re-sampling.

Also, the reconstructed picture of the reference layer from which the inter-layer reference picture is derived may be a picture belonging to the same AU as the current picture to be encoded. When inter prediction for the current block is performed by including an inter-layer reference picture in the reference picture list, the positions of the inter-layer reference picture within the reference picture list L0 and L1 may be different from each other. For example, in the case of the reference picture list L0, the inter-layer reference picture may be located after short-term reference pictures before the current picture, and in the case of the reference picture list L1, the inter-layer reference picture may be located at the end of the reference picture list.

Here, the reference picture list L0 is a reference picture list used for inter prediction of a P slice or a reference picture list used as a first reference picture list in inter prediction of a B slice. The reference picture list L1 is a second reference picture list used for inter prediction of a B slice.

Therefore, the reference picture list L0 may be composed in the order of a short-term reference picture(s) before the current picture, an inter-layer reference picture, a short-term reference picture(s) after the current picture, and a long-term reference picture. The reference picture list L1 may be composed in the order of a short-term reference picture(s) after the current picture, a short-term reference picture(s) before the current picture, a long-term reference picture, and an inter-layer reference picture.

At this time, a predictive slice (P slice) is a slice on which intra prediction is performed or inter prediction is performed using up to one motion vector and reference picture index per prediction block. A bi-predictive slice (B slice) is a slice on which intra prediction is performed, or prediction is performed using up to two motion vectors and reference picture indexes per prediction block. In this regard, an intra slice (I slice) is a slice to which only intra prediction is applied.

Also, when inter prediction for the current block is performed based on the reference picture list including an inter-layer reference picture, the reference picture list may include a plurality of inter-layer reference pictures derived from a plurality of layers.

When the reference picture list includes a plurality of inter-layer reference pictures, inter-layer reference pictures may be cross-arranged within the reference picture list L0 and L1. For example, suppose that two inter-layer reference pictures, an inter-layer reference picture $ILRP_i$, and an inter-layer reference picture $ILRP_j$ are included in the reference picture list used for inter prediction of the current block. In this case, in the reference picture list L0, $ILRP_i$ may be located after short-term reference pictures before the current picture, and $ILRP_j$ may be located at the end of the list. Also, in the reference picture list L1, $ILRP_i$ may be located at the end of the list, and $ILRP_j$ may be located after short-term reference pictures after the current picture.

In this case, the reference picture list L0 may be composed in the order of the short-term reference picture(s) before the current picture, the inter-layer reference picture $ILRP_i$, the short-term reference picture(s) after the current picture, the long-term reference picture, and the inter-layer reference picture $ILRP_j$. The reference picture list L1 may be composed in the order of the short-term reference picture(s) after the current picture, the inter-layer reference picture $ILRP_j$, the short-term reference picture(s) before the current picture, the long-term reference picture, and the inter-layer reference picture $ILRP_i$.

Also, one of the two inter-layer reference pictures may be an inter-layer reference picture derived from a scalable layer related to resolution, and the other may be an inter-layer reference picture derived from a layer providing a different view. In this case, for example, suppose $ILRP_i$ is an inter-layer reference picture derived from a layer that provides a different resolution, and $ILRP_j$ is an inter-layer reference picture derived from a layer that provides a different view. Then, in the case of scalable video coding that supports only scalability except for a view, the reference picture list L0 may be composed in the order of the short-term reference picture(s) before the current picture, the inter-layer reference picture $ILRP_i$, the short-term reference picture(s) after the current picture, and the long-term reference picture. On the other hand, the reference picture list L1 may be composed in the order of the short-term reference picture(s) after the current picture, the short-term reference picture(s) before the current picture, the long-term reference picture, and the inter-layer reference picture $ILRP_i$.

Meanwhile, for inter-layer prediction, the information of an inter-layer reference picture may be composed of only a sample value, only motion information (motion vector), or both the sample value and the motion information. When the reference picture index indicates the inter-layer reference picture, the predictor 330-1 uses only the sample value of the inter-layer reference picture, motion information (motion vector) of the inter-layer reference picture, or both of the sample value and the motion information of the inter-layer reference picture according to the information received from the encoding apparatus.

When only the sample values of the inter-layer reference picture are used, the predictor 330-1 may derive samples of a block specified by a motion vector in the inter-layer reference picture as prediction samples of the current block. In the case of scalable video coding that does not consider a view, the motion vector in inter prediction (inter-layer prediction) using the inter-layer reference picture may be set to a fixed value (for example, 0).

When only the motion information of an inter-layer reference picture is used, the predictor 530-1 may use a motion vector specified in the inter-layer reference picture as a motion vector predictor for deriving the motion vector of the current block. Also, the predictor 530-1 may use a motion vector specified in the inter-layer reference picture as the motion vector of the current block.

When both the samples and the motion information of the inter-layer reference picture are used, the predictor 330-1 may use the samples related to the current block in the inter-layer reference picture and the motion information (motion vector) specified in the inter-layer reference picture for prediction of the current block.

The decoding apparatus may receive a reference index indicating an inter-layer reference picture within the reference picture list from the encoding apparatus and perform inter-layer prediction based on the received reference index. Also, the decoding apparatus may receive, from the encoding apparatus, information that specifies which information (sample information, motion information, or sample information and motion information) to use from the inter-layer reference picture, namely, information that specifies dependency type of the dependency related to the inter-layer prediction between two layers.

Multilayer-based video/image coding may be performed using image information related to inter-layer prediction, for example, information related to an inter-layer reference picture (ILRP). The image information may be signaled from the encoding apparatus to the decoding apparatus, for example, through a high-level syntax (HLS). In the present document, the HLS may include at least one of an APS syntax, a PPS syntax, a SPS syntax, a VPS syntax, a picture header syntax, and a slice header syntax.

Figure 6:
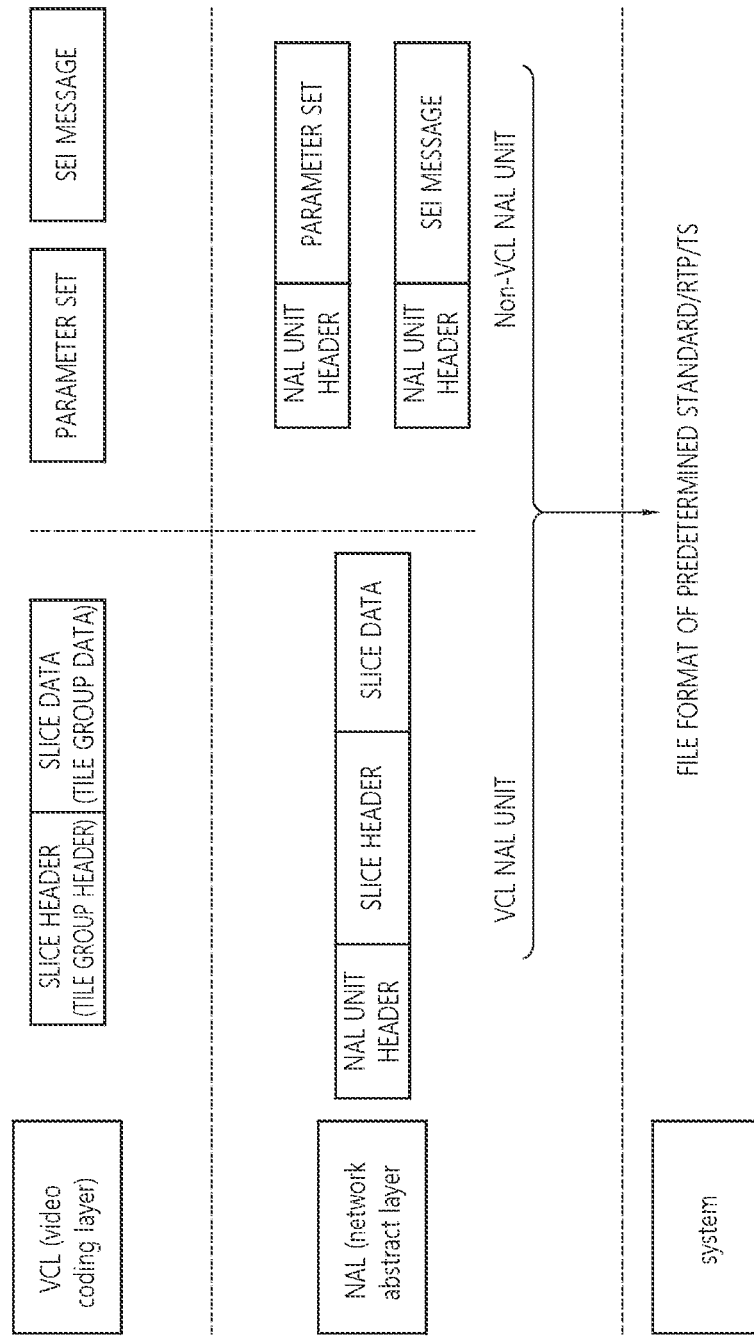
FIG. 6 illustratively shows a hierarchical structure for a coded image/video.

FIG. 6 illustratively shows a hierarchical structure for a coded image/video.

Referring to FIG. 6, coded image/video is divided into a video coding layer (VCL) that handles the decoding process of the image/video and itself, a subsystem that transmits and stores the coded information, and NAL (network abstraction layer) in charge of function and present between the VCL and the subsystem.

In the VCL, VCL data including compressed image data (slice data) is generated, or a parameter set including a picture parameter set (PSP), a sequence parameter set (SPS), and a video parameter set (VPS) or a supplemental enhancement information (SEI) message additionally required for an image decoding process may be generated.

In the NAL, a NAL unit may be generated by adding header information (NAL unit header) to a raw byte sequence payload (RBSP) generated in a VCL. In this case, the RBSP refers to slice data, parameter set, SEI message, etc., generated in the VCL. The NAL unit header may include NAL unit type information specified according to RBSP data included in the corresponding NAL unit.

As shown in the FIG. 6, the NAL unit may be classified into a VCL NAL unit and a Non-VCL NAL unit according to the RBSP generated in the VCL. The VCL NAL unit may mean a NAL unit that includes information on the image (slice data) on the image, and the Non-VCL NAL unit may mean a NAL unit that includes information (parameter set or SEI message) required for decoding the image.

The above-described VCL NAL unit and Non-VCL NAL unit may be transmitted through a network by attaching header information according to the data standard of the subsystem. For example, the NAL unit may be transformed into a data format of a predetermined standard such as an H.266/VVC file format, a real-time transport protocol (RTP), a transport stream (TS), etc., and transmitted through various networks.

As described above, the NAL unit may be specified with the NAL unit type according to the RBSP data structure included in the corresponding NAL unit, and information on the NAL unit type may be stored and signaled in the NAL unit header.

For example, the NAL unit may be classified into a VCL NAL unit type and a Non-VCL NAL unit type according to whether the NAL unit includes information (slice data) about an image. The VCL NAL unit type may be classified according to the nature and type of pictures included in the VCL NAL unit, and the Non-VCL NAL unit type may be classified according to types of parameter sets.

The following is an example of the NAL unit type specified according to the type of parameter set included in the Non-VCL NAL unit type.

APS (Adaptation Parameter Set) NAL unit: Type for NAL unit including APS
DPS (Decoding Parameter Set) NAL unit: Type for NAL unit including DPS
VPS (Video Parameter Set) NAL unit: Type for NAL unit including VPS
SPS (Sequence Parameter Set) NAL unit: Type for NAL unit including SPS
PPS (Picture Parameter Set) NAL unit: Type for NAL unit including PPS
PH (Picture header) NAL unit: Type for NAL unit including PH The aforementioned NAL unit types may have syntax information for the NAL unit type, and the syntax information may be stored and signaled in a NAL unit header. For example, the syntax information may be nal_unit_type, and NAL unit types may be specified by a nal_unit_type value.

As described above, one picture may include a plurality of slices, and one slice may include a slice header and slice data. In this case, one picture header may be further added for the plurality of slices (a set of slice headers and slice data) in one picture. The picture header (picture header syntax) may include information/parameter commonly applicable to the picture. For example, one picture may include slices of different types, such as an intra-coded slice (i.e., an I-slice) and/or an inter-coded slice (i.e., a P-slice and a B-slice). In this case, the picture header may include information/parameter applied to the intra-coded slice and the inter-coded slice. Alternatively, one picture may include slices of one type.

The slice header (slice header syntax) may include information/parameter commonly applicable to the slice. The APS (APS syntax) or PPS (PPS syntax) may include information/parameter commonly applicable to one or more slices or pictures. The SPS (SPS syntax) may include information/parameter commonly applicable to one or more sequences. The VPS (VPS syntax) may include information/parameter commonly applicable to multiple layers. The DPS (DPS syntax) may include information/parameter commonly applicable to the entire video. The DPS may include information/parameter related to concatenation of a coded video sequence (CVS).

In this document, video/image information encoded by an encoding apparatus and signaled to a decoding apparatus in the form of a bitstream may include not only intra-picture partitioning related information, intra/inter prediction information, inter-layer prediction related information, residual information, and in-loop filtering information but also information included in the slice header, information included in the picture header, information included in the APS, information included in the PPS, information included in the SPS, information included in the VPS, and/or information included in DPS. In addition, the video/image information may further include information of a NAL unit header.

A bitstream supporting temporal scalability (or a temporal scalable bitstream) includes information on a temporally scaled temporal layer. The information on the temporal layer may include identification information on a temporal layer specified according to temporal scalability of a NAL unit. For example, the identification information on the temporal layer may be represented using a variable of a temporal ID (TemporalId). The temporal ID (TemporalId) may use temporal_id syntax information, and the temporal_id syntax information may be stored in a NAL unit header in the encoding apparatus and be signaled to the decoding apparatus. Hereinafter, in the present specification, a temporal layer may be referred to as a sublayer, a temporal sublayer, or a temporal scalable layer.

Figure 7:
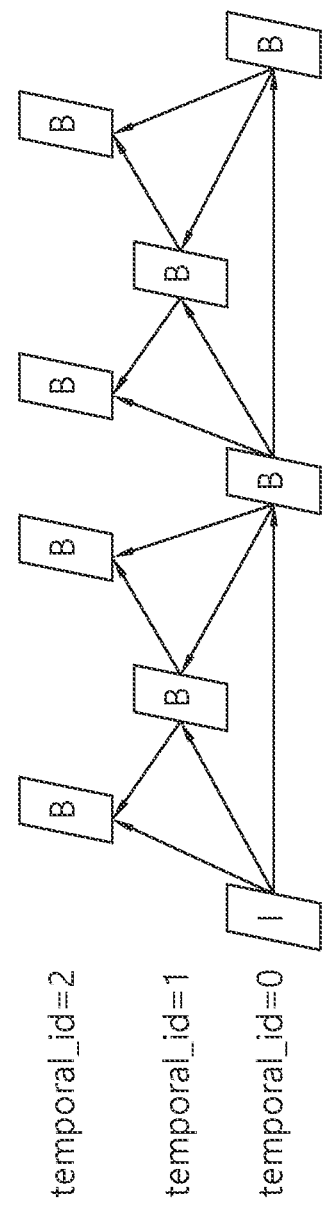
FIG. 7 illustrates a temporal layer structure for NAL units in a bitstream supporting temporal scalability.

FIG. 7 illustrates a temporal layer structure for NAL units in a bitstream supporting temporal scalability.

When a bitstream supports temporal scalability, NAL units included in the bitstream may have identification information on a temporal layer (e.g., temporal_id). For example, a temporal layer including NAL units having a temporal_id value of 0 may provide the lowest temporal scalability, and a temporal layer including NAL units having a temporal_id value of 2 may provide the highest temporal scalability. can In FIG. 7, a box indicated with I may denote an I picture, and a box indicated with B may denote a B picture. In addition, an arrow may indicate a reference relationship with respect to whether a picture refers to another picture.

As illustrated in FIG. 7, the NAL units of the temporal layer having the temporal_id value of 0 are reference pictures to which NAL units of a temporal layer having a temporal_id value of 0, 1, or 2 may refer. NAL units of a temporal layer having a temporal_id value of 1 are reference pictures to which NAL units of a temporal layer having a temporal_id value of 1 or 2 may refer. The NAL units of the temporal layer having the temporal_id value of 2 may be reference pictures to which the NAL units of the same temporal layer, that is, the temporal layer having the temporal_id value of 2, may refer, or may be non-reference pictures to which other pictures do not refer.

As illustrated in FIG. 7, when the NAL units of the temporal layer having the temporal_id value of 2, that is, the highest temporal layer, are non-reference pictures, the NAL units may be extracted (or removed) from the bitstream without affecting the other pictures in a decoding process.

In the prior art, there is the following problem in signaling information on the maximum number of temporal sublayers through a bitstream and using the information. Conventionally, the information on the maximum number of temporal sublayers exists in both a VPS and a SPS. When the bitstream to be decoded has more than one layer, information on the maximum number of temporal sublayers used is information signaled through the VPS, and when the bitstream to be decoded has only one layer, information on the maximum number of temporal sublayers used needs to be information on the maximum number of temporal sublayers signaled through the SPS but is information signaled through the VPS. That is, when the bitstream to be decoded has only one layer, the information on the maximum number of temporal sublayers used needs to be the information on the maximum number of temporal sublayers signaled through the SPS, but information on the maximum number of temporal sublayers currently used is signaled through the VPS, which causes a problem.

Specifically, VVC allows both a case where the VPS exists and a case where no VPS exists for a bitstream including a single layer, which may cause a problem. In other words, when the bitstream includes only one layer, the VPS may not exist, and even when the VPS does not exist, information on the maximum number of temporal sublayers is signaled through the VPS, which may cause a problem.

Hereinafter, a method for solving the above problem is proposed. The proposed method may include the following features.

Feature 1. When a bitstream to be decoded includes only one layer, information on the maximum number of temporal sublayers to be used by a decoder in a decoding process may be information on the maximum number of temporal sublayers signaled through a SPS. That is, in this case, the information on the maximum number of temporal sublayers may include a sps_max_sublayers_minus1 syntax element. In other words, when the bitstream to be decoded includes a single layer, the information on the maximum number of temporal sublayers to be used by the decoder in the decoding process may be included in the SPS and parsed.

However, when the bitstream to be decoded includes more than one layer, the information on the maximum number of temporal sublayers to be used by the decoder in the decoding process may be information on the maximum number of temporal sublayers signaled through a VPS. That is, in this case, the information on the maximum number of temporal sublayers may include a vps_max_sublayers_minus1 syntax element. In other words, when the bitstream to be decoded includes multiple layers, the information on the maximum number of temporal sublayers to be used by the decoder in the decoding process may be included in the VPS and parsed.

Feature 2. A variable for specifying the information on the maximum number of temporal sublayers in the bitstream to be decoded may be defined. The variable may be derived as follows.

a) The variable for specifying the information on the maximum number of temporal sublayers may be referred to as MaxTemporalSublayersMinus1.

b) When the bitstream to be decoded has only one layer, the value of the variable for specifying the information on the maximum number of temporal layers may be derived based on the value of the information on the maximum number of temporal sublayers included and signaled in the SPS to which the layer refers to.

c) Otherwise (i.e., when the bitstream to be decoded has more than one layer), when the bitstream to be decoded has only one layer, the value of the variable for specifying the information on the maximum number of temporal layers may be derived based on the value of the information on the maximum number of temporal sublayers included and signaled in the VPS to which the layer refers to.

d) The bitstream to be decoded may be determined based on a target output layer set (OLS) index. The target OLS index may be referred to as TargetOlsIdx.

e) MaxTemporalSublayersMinus1 may be derived by Equation 1.

$$\text{MaxTemporalSublayersMinus1} = (\text{NumLayersInOls}[\text{TargetOlsIdx}] > 1)\,?\,\text{vps\_max\_sublayers\_minus1} : \text{sps\_max\_sublayers\_minus1} \quad \text{[Equation 1]}$$

Feature 3. Alternatively, the variable for specifying the information on the maximum number of temporal sublayers may be referred to as MaxTemporalSublayers.

a) MaxTemporalSublayers may be derived by Equation 2.

$$\text{MaxTemporalSublayers} = (\text{NumLayersInOls}[\text{TargetOlsIdx}] > 1)\,?\,\text{vps\_max\_sublayers\_minus1} + 1 : \text{sps\_max\_sublayers\_minus1} + 1 \quad \text{[Equation 2]}$$

Feature 4. The maximum value (i.e., Htid) of a temporal ID (TemporalId) may be limited to a value not greater than MaxTemporalSublayersMinus1.

Feature 5. The variable MaxTemporalSublayersMinus1 may be used instead of the value of vps_max_sublayers_minus1 or the value of sps_max_sublayers_minus1 in the decoding process.

Hereinafter, a method for signaling information on the maximum number of temporal sublayers will be described with reference to Table 1 to Table 5.

Image information for performing image encoding/decoding may include image information including information related to a temporal sublayer and information related to a target output layer set (OLS).

The image information may include a video parameter set (VPS) and a sequence parameter set (SPS).

The information related to the temporal sublayer may include information on the maximum number of temporal sublayers. The information related to the target OLS may include the number of layers included in the target OLS.

As described above, when a bitstream includes only a single layer, the VPS may be optional. In other words, when the target OLS includes a single layer, that is, only one layer, the VPS may or may not exist.

When the VPS does not exist, the value of a syntax element sps_video_parameter_set_id may be 0. The syntax element sps_video_parameter_set_id may indicate, for example, the VPS to which the SPS refers.

TABLE 1 sps_video_parameter_set_id, when greater than 0, specifies the value of vps_video_parameter_set_id for the VPS referred to by the SPS.

When sps_video_parameter_set_id is equal to 0, the following applies:
- The SPS does not refer to a VPS, and no VPS is referred to when decoding each CLVS referring to the SPS.
- The value of vps_max_layers_minus1 is inferred to be equal to 0.
- The value of vps_max_sublayers_minus1 is inferred to be equal to 6.
- The CVS shall contain only one layer (i.e., the value of NumLayersInOls[ 0 ] is inferred to be equal to 1 and all VCL NAL unit in the CVS shall have the same value of nuh_layer_id).
- The value of GeneralLayerIdx[ nuh_layer_id ] is inferred to be equal to 0.
- The value of vps_independent_layer_flag[ GeneralLayerIdx[ nuh_layer_id ] ] is inferred to be equal to 1.

When vps_independent_layer_flag[ GeneralLayerIdx[ nuh_layer_id ] ] is equal to 1, the SPS referred to by a CLVS with a particular nuh_layer_id value nuhLayerId shall have nuh_layer_id equal to nuhLayerId.

The value of sps_video_parameter_set_id shall be the same in all SPSs that are referred to by CLVSs in a CVS.

...

For example, referring to Table 1, when the value of the sps_video_parameter_set_id syntax element is 0, a CVS may include only one layer. That is, when the value of the sps_video_parameter_set_id syntax element is 0, the value of NumLayersInOls may be derived as 1. NumLayersInOls may indicate the number of layers included in the OLS. Accordingly, when the value of the sps_video_parameter_set_id syntax element is 0, the number of layers included in the target OLS is 1, and thus the information on the maximum number of temporal sublayers may be included in the SPS.

In another example, even when the value of the sps_video_parameter_set_id syntax element is not 0, the number of layers included in the target OLS may be one. In other words, unlike Table 1, even when the value of the sps_video_parameter_set_id syntax element is not 0, the target OLS may have a single layer. Even in this case, whether the information on the maximum number of temporal sublayers is included in the VPS or the SPS may be determined based on the number of layers included in the target OLS.

Table 2 illustrates a method for determining whether the information on the maximum number of temporal sublayers is signaled by being included in the VPS or signaled by being included in the SPS.

Referring to Table 2, a variable MaxTemporalSublayersMinus1 for specifying the information on the maximum number of temporal sublayers may be derived based on the information related to the target OLS as follows. Specifically, MaxTemporalSublayersMinus1 may be derived based on the number of layers included in the target OLS included in the information related to the target OLS.

When the number of layers included in the target OLS, that is, NumLayersInOls[TargetOlsIdx], is 1, the value of MaxTemporalSublayersMinus1 may be set to be equal to sps_max_sublayers_minus1. sps_max_sublayers_minus1 may be the information on the maximum number of temporal sublayers signaled via the SPS.

However, when the number of layers included in the target OLS, that is, NumLayersInOls[TargetOlsIdx], is greater than 1, the value of MaxTemporalSublayersMinus1 may be set to be equal to vps_max_sublayers_minus1. vps_max_sublayers_minus1 may be the information on the maximum number of temporal sublayers signaled via the VPS.

Due to Feature 5 described above, that is, the variable MaxTemporalSublayersMinus1 being available instead of the value of vps_max_sublayers_minus1 or the value sps_max_sublayers_minus1 in a decoding procedure, a suit-

TABLE 2

The variables TargetOlsIdx, which identifies the OLS index of the target OLS to be decoded, and the variable Htid, which identifies the highest temporal sublayer to be decoded, are set by some external means not specified in this Specification. The bitstream BitstreamToDecode does not contain any other layers than those included in the target OLS and does not include any NAL unit with TemporalId greater than Htid.

The variable MaxTemporalSublayersMinus1 is defined as follows:
- If NumLayersInOls[ TargetOlsIdx ] is equal to 1, the value of MaxTemporalLSublayersMinus1 is set to be equal to sps_max_sublayers_minus1.
- Otherwise (i.e., NumLayersInOls[ TargetOlsIdx ] is greater than 1), the value of MaxTemporalLSublayersMinus1 is set to be equal to vps_max_sublayers_minus1.

The value of Htid shall not be greater than MaxTemporalSublayersMinus1.

...

ability test for a bitstream using a hypothetical reference decoder (HRD) and the decoder may be performed as follows in Table 3.

TABLE 3

For each test, the following ordered steps apply in the order listed, followed by the processes described after these steps in this clause:
1. An operation point under test, denoted as targetOp, is selected by selecting a target OLS with OLS index opOlsIdx, a highest TemporalId value opTid, and optionally, a list of target subpicture index values opSubpicIdxList[ ], one for each layer. The value of opOlsIdx is in the range of 0 to TotalNumOlss − 1, inclusive. The value of opTid is in the range of 0 to MaxTemparalSublayersMinus1, inclusive.
If opSubpicIdxList[ ] is not present, targetOp consists of pictures, and each pair of selected values of opOlsIdx and opTid shall be such that the sub-bitstream BitstreamToDecode that is the output by invoking the sub-bitstream extraction process as specified in clause C.6 with entireBitstream, opOlsIdx, and opTid as inputs satisify the following condition:
- There is at least one VCL NAL unit with TemporalId equal to opTid in BitstreamToDecode.
Otherwise (opSubpicIdxList[ ] is present), targetOp consists of subpictures, and the sub-bitstream that is the output by invoking the subpicture sub-bitstream extraction process as specified in clause C.7 with entireBitstream, opOlsIdx, opTid, and opSubpicIdxList[ ] as inputs satisify the following conditions:
- There is at least one VCL NAL unit with TemporalId equal to opTid in BitstreamToDecode.
- There is at least one VCL NAL unit with nuh_layer_id equal to LayerIdInOls[ opOlsIdx ][ j ] and with sh_subpic_id equal to SubpicIdVal[ opSubpicIdxList[ j ] ] for each j in the range of 0 to NumLayersInOls[ opOlsIdx ] − 1.
NOTE 2 - Regardless of whether opSubpicIdxList[ ] is present, due to that each IRAP or GDR AU needs to be complete, there is at least one VCL NAL unit with nuh_layer_id equal to each of the nuh_layer_id values in LayerIdInOls[ opOlsIdx ] in BitstreamToDecode.

For example, a point (targetOp) where the suitability test is performed may be selected by selecting a target OLS with an OLS index of opOslIdx, a maximum temporal ID (TemporalId) of opTid, and optionally, a list of target subpicture index values of opSubpicIdxList[ ]. Here, opTid ranges from 0 to MaxTemporalSublayersMinus1. As described above, since the maximum temporal ID (TemporalId), that is, the maximum value of a temporal ID (TemporalId) is limited to a value not greater than MaxTemporalSublayersMinus1, the value of the maximum temporal ID (TemporalId) ranges from 0 to MaxTemporalSublayersMinus1.

Due to Feature 5 described above, that is, the variable MaxTemporalSublayersMinus1 being available instead of the value of vps_max_sublayers_minus1 or the value of sps_max_sublayers_minus1 in the decoding process, semantics of the following syntax element may be illustrated as in Table 4. That is, for example, the value of a syntax element bp_max_sublayers_minus1 may range from 0 to MaxTemporalSublayersMinus1.

temporal sublayers for which a CPB removal delay and a CPB removal offset are indicated in a BP SEI message. The value of bp_max_sublayers_minus1 may range from 0 to vps_max_sublayers_minus1. bp_max_sublayers_minus1 may be signaled in a SEI message. For example, bp_max_sublayers_minus1 may be signaled in a buffering period SEI message.

The image/video information may include HLS, and the HLS may include the information related to the temporal sublayer. Further/alternatively, the HLS may include information related to the OLS. The information related to the OLS may include the information related to the target OLS.

An OLS may be a layer set in which one or more layers are designated as output layers. An OLS layer index may be an index for indicating a layer of the OLS in a layer list of the OLS.

A (temporal) sublayer may be a temporal scalable layer of a temporal scalable bitstream including a VCL NAL unit having a variable TemporalId indicating a specific value and an associated non-VCL NAL unit. For example, in inter prediction, a (decoded) picture having a TemporalId smaller than or equal to a TemporalId of a current picture may be used as a reference picture.

The variable TemporalId may be derived as shown in Table 5.

TABLE 4 bp_max_sublayers_minus1 plus 1 specifies the maximum number of temporal sublayers for which CPB removal delay and CPB removal offset are indicated in the BP SEI message. The value of bp_max_sublayers_minus1 shall be in the range of 0 to MaxTemporalSublayersMinus1, inclusive.

The syntax element sps_video_parameter_set_id indicating the VPS to which the SPS refers may be signaled through the SPS, and the SPS may further deliver sps_max_sublayers_minus1 specifying the maximum number of

TABLE 5

The variable TemporalId may be derived as follows:
TemporalId = nuh_temporal_id_plus1 − 1
nuh_temproal_id_plus1 may be signaled through a NAL unit header of a NAL unit
When nad_unit_type (in a NAL unit header) is in the range of IDR_W_RADL to RSV_IRAP_12, inclusive, TemporalId shall be equal to 0.
When nal_unit_type is equal to STSA_NUT and TABLE 5-continued vps_independent_layer_flag[ GeneralLayerIdx[ nuh_layer_id ] ] is equal to 1, TemporalId shall not be equal to 0.
The value of TemporalId shall be the same for all VCL NAL units of an AU. The value of TemporalId of a coded picture, a PU, or an AU is the value of the TemporalId of the VCL NAL units of the coded picture, PU, or AU. The value of TemporalId of a sublayer representation is the greatest value of TemporalId of all VCL NAL units in the sublayer representation.
The value of TemporalId for non-VCL NAL units is constrained as follows:
- If nal_unit_type is equal to DCI_NUT, VPS_NUT, or SPS_NUT, TemporalId shall be equal to 0 and the TemporalId of the AU containing the NAL unit shall be equal to 0.
- Otherwise, if nal_unit_type is equal to PH_NUT, TemporalId shall be equal to the TemporalId of the PU containing the NAL unit.
- Otherwise, if nal_unit_type is equal to EOS_NUT or EOB_NUT, TemporalId shall be equal to 0.
- Otherwise, if nal_unit_type is equal to AUD_NUT, FD_NUT, PREFTX_SEI_NUT, or SUFFIX_SEI_NUT, TemporalId shall be equal to the TemporalId of the AU containing the NAL unit.
- Otherwise, when nal_unit_type is equal to PPS_NUT, PREFIX_APS_NUT, or SUFFIX_APS_NUT, TemporalId shall be greater than or equal to the TemporalId of the PU containing the NAL unit.
NOTE - When the NAL unit is a non-VCL NAL unit, the value of TemporalId is equal to the minimum value of the TemporalId values of all AUs to which the non-VCL NAL unit applies. When nal_unit_type is equal to PPS_NUT, PREFIX_APS_NUT, or SUFFIX_APS_NUT, TemporalId may be greater than or equal to the TemporalId of the containing AU, as all PPSs and APSs may be included in the beginning of the bitstream (e.g., when they are transported out-of-band, and the receiver places them at the beginning of the bitstream), wherein the first coded picture has TemporalId equal to 0.

Figure 8:
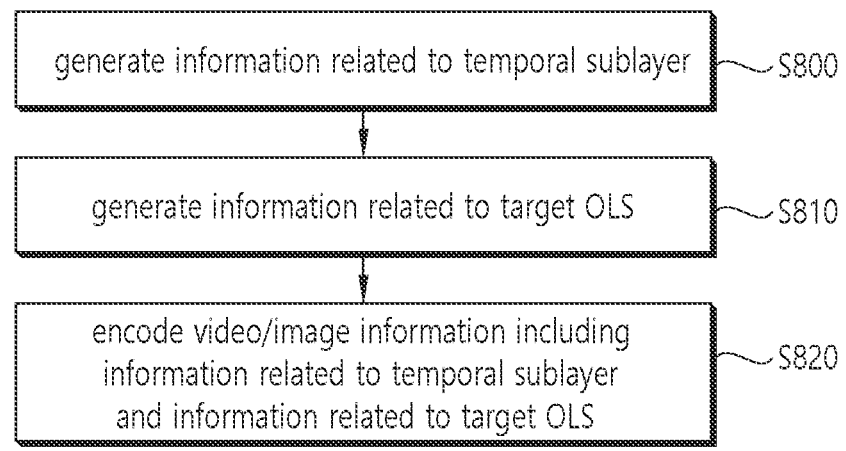
FIG. 8 and FIG. 9 schematically illustrate an example of a video/image encoding method and related components according to an exemplary embodiment(s) of the present document.
Figure 9:
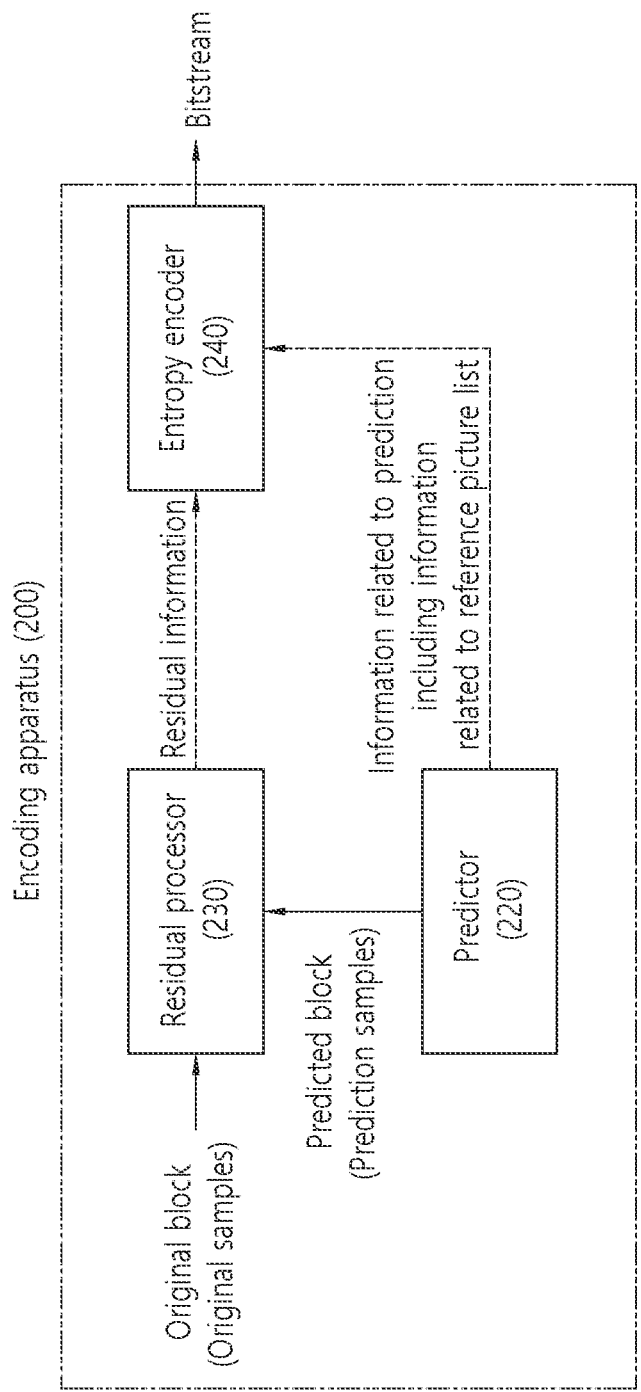

FIG. 8 and FIG. 9 schematically illustrate an example of a video/image encoding method and related components according to an exemplary embodiment(s) of the present document.

The method disclosed in FIG. 8 may be performed by the encoding apparatus 200 disclosed in FIG. 2 and/or FIG. 3. Specifically, S800 and S810 of FIG. 8 may be performed by the predictor of the encoding apparatus 200, and S820 may be performed by the entropy encoder 240 of the encoding apparatus 200. The method disclosed in FIG. 8 may include the embodiments proposed in this document.

Referring to FIG. 8, the encoding apparatus generates information related to a temporal sublayer (S800). The encoding apparatus generates information related to a target OLS (S810).

For example, the information related to the temporal sublayer may include information on the maximum number of temporal sublayers. For example, the information related to the target OLS may include the number of layers included in the target OLS. That is, the information related to the target OLS may indicate the number of layers included in the target OLS.

The encoding apparatus may derive prediction samples for a current block by performing prediction based on the information related to the temporal sublayer. Further, the encoding apparatus may derive residual samples based on the prediction samples. For example, the encoding apparatus may derive the residual samples by comparing original samples of the current block with the prediction samples. The encoding apparatus may generate residual information based on the residual samples, and may additionally generate residual samples from already reconstructed samples.

The encoding apparatus encodes video/image information (S820). The video/image information may include the information related to the temporal sublayer and the information related to the target OLS. The video/image information may include a video parameter set (VPS) and/or a sequence parameter set (SPS). The video/image information may include prediction information and residual information. The prediction information is information related to the prediction procedure, and may include prediction mode information (e.g., a skip flag, a merge flag, or a mode index) and information on motion information. The information on the motion information may include candidate selection information (e.g., a merge index, a mvp flag, or a mvp index) which is information for deriving a motion vector. Further, the information on the motion information may include information on the foregoing MVD and/or reference picture index information. In addition, the information on the motion information may include information indicating whether L0 prediction, L1 prediction, or bi-prediction is applied. The residual information is information on the residual samples. The residual information may include information on quantized transform coefficients for the residual samples.

The encoded video/image information may be output in the form of a bitstream. The bitstream may be transmitted to a decoding apparatus through a network or a storage medium.

Further, as described above, the encoding apparatus may generate a reconstructed picture (including reconstructed samples and reconstructed blocks) based on the reference samples and the residual samples. This process is for the encoding apparatus to derive the same prediction result as that achieved by the decoding apparatus, thereby increasing coding efficiency. Accordingly, the encoding apparatus may store the reconstructed picture (or reconstructed samples and reconstructed blocks) in a memory, and may use the reconstructed picture as a reference picture for inter prediction. As described above, an in-loop filtering procedure may be further applied to the reconstructed picture.

The video/image information may include various types of information according to an exemplary embodiment of the present document.

For example, the video/image information may include the information related to the temporal sublayer and the information related to the target OLS. The information related to the temporal sublayer may include the information on the maximum number of temporal sublayers, and the information related to the target OLS may include the number of layers included in the target OLS. The information on the maximum number of temporal sublayers may be determined based on the maximum number of layers included in the OLS.

For example, whether the information on the maximum number of temporal sublayers is included in the VPS or the SPS may be determined based on the maximum number of layers included in the OLS.

Specifically, when the number of layers included in the target OLS is 1, that is, when the target OLS includes a single layer, the information on the maximum number of temporal sublayers may be included in the SPS.

However, when the number of layers included in the target OLS is greater than 1, that is, when the target OLS includes a plurality of layers, the information on the maximum number of temporal sublayers may be included in the VPS.

In another example, the information on the maximum number of temporal sublayers may be information included in the VPS or the SPS and transmitted to a decoding end, and whether the information on the maximum number of temporal sublayers is information based on the VPS or information based on the SPS may be determined based on the number of layers included in the target OLS.

Specifically, when the number of layers included in the target OLS is 1, that is, when the target OLS includes a single layer, the information on the maximum number of temporal sublayers may be the information based on the SPS.

However, when the number of layers included in the target OLS is greater than 1, that is, when the target OLS includes a plurality of layers, the information on the maximum number of temporal sublayers may be the information based on the VPS.

Here, for example, the value of the information on the maximum number of temporal sublayers may be set as a value of the maximum number of temporal sublayers minus 1. In this case, the value of the information on the maximum number of temporal sublayers plus 1 may be equal to the maximum number of temporal sublayers. The information on the maximum number of temporal sublayers may be derived based on Equation 1 described above.

That is, the information on the maximum number of temporal sublayers may be derived based on MaxTemporalSublayersMinus1=(NumLayersInOls[TargetOlsIdx]>1)?vps_max_sublayers_minus1:sps_max_sublayers_minus1. When a condition NumLayersInOls[TargetOlsIdx]>1 is true, that is, when the bitstream to be decoded includes a plurality of layers, MaxTemporalSublayersMinus1 may be derived as vps_max_sublayers_minus1, and when the condition NumLayersInOls[TargetOlsIdx]>1 is false, that is, when the bitstream to be decoded includes a single layer, MaxTemporalSublayersMinus1 may be derived as sps_max_sublayers_minus1.

Here, MaxTemporalSublayersMinus1 represents the information on the maximum number of temporal sublayers, NumLayersInOls[TargetOlsIdx] represents the number of layers included in the target OLS, vps_max_sublayers_minus1 represents the information on the maximum number of temporal sublayers included in the VPS, and sps_max_sublayers_minus1 represents the information on the maximum number of temporal sublayers included in the SPS.

In another example, the value of the information on the maximum number of temporal sublayers may be set to be equal to the maximum number of temporal sublayers. The information on the maximum number of temporal sublayers may be derived based on Equation 2 described above.

That is, the information on the maximum number of temporal sublayers may be derived based on MaxTemporalSublayers=(NumLayersInOls[TargetOlsIdx]>1)?vps_max_sublayers_minus1+1:sps_max_sublayers_minus1+1. When a condition NumLayersInOls[TargetOlsIdx]>1 is true, that is, when the bitstream to be decoded includes a plurality of layers, MaxTemporalSublayers may be derived as vps_max_sublayers_minus1+1, and when the condition NumLayersInOls[TargetOlsIdx]>1 is false, that is, when the bitstream to be decoded includes a single layer, MaxTemporalSublayers may be derived as sps_max_sublayers_minus1+1.

Here, MaxTemporalSublayers represents the information on the maximum number of temporal sublayers, NumLayersInOls[TargetOlsIdx] represents the number of layers included in the target OLS, vps_max_sublayers_minus1 represents the information on the maximum number of temporal sublayers included in the VPS, and sps_max_sublayers_minus1 represents the information on the maximum number of temporal sublayers included in the SPS.

For example, the information related to the temporal sublayer may include a temporal ID (TemporalId). The maximum value of TemporalId may not be larger than the maximum number of temporal sublayers represented by the information on the maximum number of temporal sublayers. That is, the maximum value of TemporalId may be smaller than or equal to the maximum number of temporal sublayers.

Figure 10:
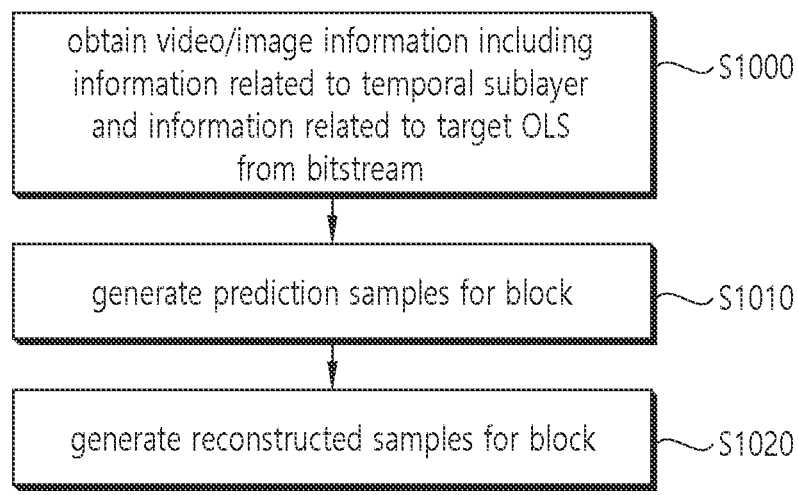
FIG. 10 and FIG. 11 schematically illustrate an example of a video/image decoding method and related components according to an exemplary embodiment(s) of the present document.
Figure 11:
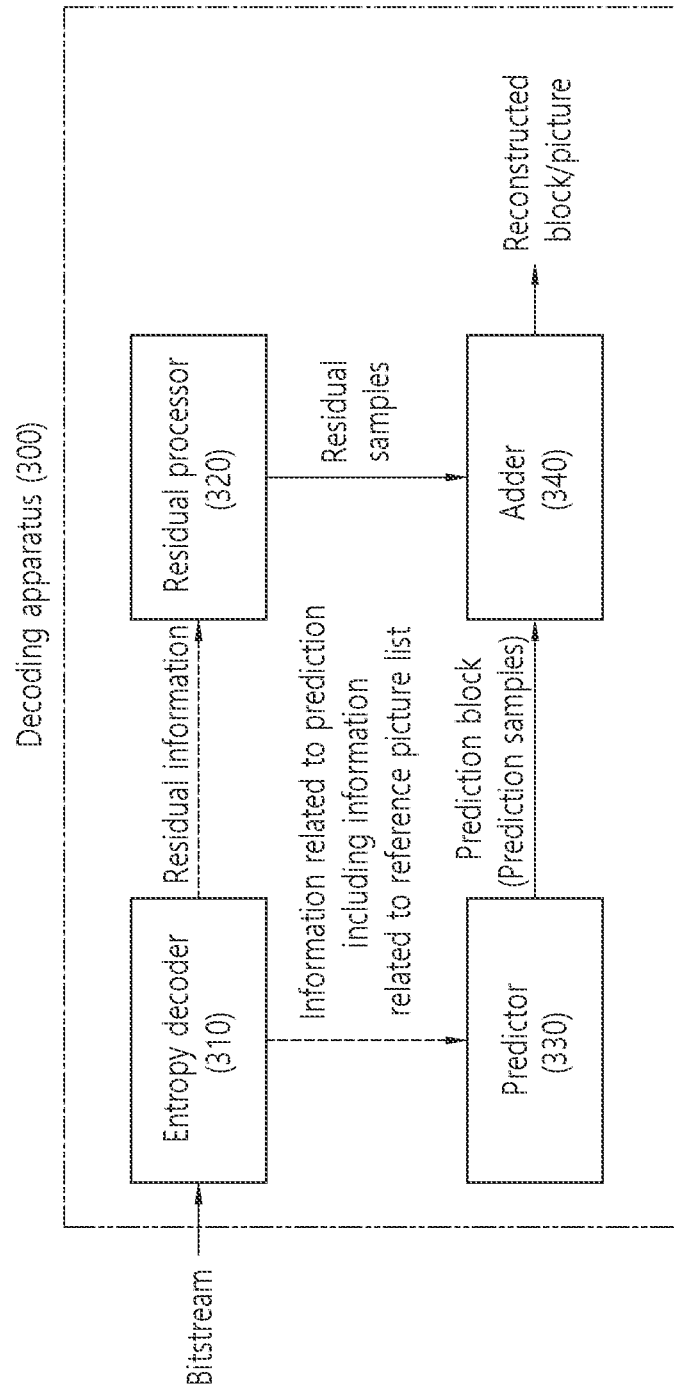

FIG. 10 and FIG. 11 schematically illustrate an example of a video/image decoding method and related components according to an exemplary embodiment(s) of the present document.

The method disclosed in FIG. 10 may be performed by the decoding apparatus 300 disclosed in FIG. 4 and/or FIG. 5. Specifically, S1000 of FIG. 10 may be performed by the entropy decoder 310 of the decoding apparatus 300, S1010 may be performed by the predictor 330 of the decoding apparatus 300, S1020 may be performed by the adder 340 of the decoding apparatus 300. The method disclosed in FIG. 10 may include the embodiments proposed in this document.

Referring to FIG. 10, the decoding apparatus receives/obtains video/image information (S1000). For example, the decoding apparatus may receive/obtain the video/image information through a bitstream. In one example, the decoding apparatus may receive/obtain the video/image information through the bitstream, and the video/image information may include information related to a temporal sublayer and information related to a target OLS.

For example, the information related to the temporal sublayer may include information on the maximum number of temporal sublayers. For example, the information related to the target OLS may include the number of layers included in the target OLS. That is, the information related to the target OLS may indicate the number of layers included in the target OLS.

For example, the video/image information may include prediction information and residual information. The prediction information is information related to the prediction procedure, and may include prediction mode information (e.g., a skip flag, a merge flag, or a mode index) and information on motion information. The information on the motion information may include candidate selection information (e.g., a merge index, a mvp flag, or a mvp index) which is information for deriving a motion vector. Further, the information on the motion information may include information on the foregoing MVD and/or reference picture index information. In addition, the information on the motion information may include information indicating whether L0 prediction, L1 prediction, or bi-prediction is applied. The residual information is information on residual samples. The residual information may include information on quantized transform coefficients for the residual samples.

The decoding apparatus derives prediction samples for a current block (S1010). For example, the decoding apparatus may generate reconstructed samples for the current block based on the prediction samples. For example, the decoding apparatus may generate the reconstructed samples for the current block based on the residual samples and the prediction samples for the current block. The residual samples for the current block may be generated based on the received residual information. Further, in one example, the decoding apparatus may generate a reconstructed picture including the reconstructed samples. Subsequently, as described above, an in-loop filtering procedure may be further applied to the reconstructed picture.

The video/image information may include various types of information according to an exemplary embodiment of the present document.

For example, the video/image information may include the information related to the temporal sublayer and the information related to the target OLS. The information related to the temporal sublayer may include the information on the maximum number of temporal sublayers, and the information related to the target OLS may include the number of layers included in the target OLS. The information on the maximum number of temporal sublayers may be determined based on the maximum number of layers included in the OLS.

For example, whether the information on the maximum number of temporal sublayers is included in a VPS or a SPS may be determined based on the maximum number of layers included in the OLS.

Specifically, when the number of layers included in the target OLS is 1, that is, when the target OLS includes a single layer, the information on the maximum number of temporal sublayers may be included in the SPS.

However, when the number of layers included in the target OLS is greater than 1, that is, when the target OLS includes a plurality of layers, the information on the maximum number of temporal sublayers may be included in the VPS.

In another example, the information on the maximum number of temporal sublayers may be determined based on information transmitted through the VPS or the SPS, and whether the information on the maximum number of temporal sublayers is information based on the VPS or information based on the SPS may be determined based on the number of layers included in the target OLS.

Specifically, when the number of layers included in the target OLS is 1, that is, when the target OLS includes a single layer, the information on the maximum number of temporal sublayers may be the information based on the SPS.

However, when the number of layers included in the target OLS is greater than 1, that is, when the target OLS includes a plurality of layers, the information on the maximum number of temporal sublayers may be the information based on the VPS.

Here, for example, the value of the information on the maximum number of temporal sublayers may be set as a value of the maximum number of temporal sublayers minus 1. In this case, the value of the information on the maximum number of temporal sublayers plus 1 may be equal to the maximum number of temporal sublayers. The information on the maximum number of temporal sublayers may be derived based on Equation 1 described above.

That is, the information on the maximum number of temporal sublayers may be derived based on MaxTemporalSublayersMinus1=(NumLayersInOls[TargetOlsIdx]>1)?vps_max_sub_layers_minus1:sps_max_sub_layers_minus1. When a condition NumLayersInOls[TargetOlsIdx]>1 is true, that is, when the bitstream to be decoded includes a plurality of layers, MaxTemporalSublayersMinus1 may be derived as vps_max_sublayers_minus1, and when the condition NumLayersInOls[TargetOlsIdx]>1 is false, that is, when the bitstream to be decoded includes a single layer, MaxTemporalSublayersMinus1 may be derived as sps_max_sublayers_minus1.

Here, MaxTemporalSublayersMinus1 represents the information on the maximum number of temporal sublayers, NumLayersInOls[TargetOlsIdx] represents the number of layers included in the target OLS, vps_max_sublayers_minus1 represents the information on the maximum number of temporal sublayers included in the VPS, and sps_max_sublayers_minus1 represents the information on the maximum number of temporal sublayers included in the SPS.

In another example, the value of the information on the maximum number of temporal sublayers may be set to be equal to the maximum number of temporal sublayers. The information on the maximum number of temporal sublayers may be derived based on Equation 2 described above.

That is, the information on the maximum number of temporal sublayers may be derived based on MaxTemporalSublayers=(NumLayersInOls[TargetOlsIdx]>1)?vps_max_sublayers_minus1+1:sps_max_sublayers_minus1+1. When a condition NumLayersInOls[TargetOlsIdx]>1 is true, that is, when the bitstream to be decoded includes a plurality of layers, MaxTemporalSublayers may be derived as vps_max_sublayers_minus1+1, and when the condition NumLayersInOls[TargetOlsIdx]>1 is false, that is, when the bitstream to be decoded includes a single layer, MaxTemporalSublayers may be derived as sps_max_sublayers_minus1+1.

Here, MaxTemporalSublayers represents the information on the maximum number of temporal sublayers, NumLayersInOls[TargetOlsIdx] represents the number of layers included in the target OLS, vps_max_sublayers_minus1 represents the information on the maximum number of temporal sublayers included in the VPS, and sps_max_sublayers_minus1 represents the information on the maximum number of temporal sublayers included in the SPS.

For example, the information related to the temporal sublayer may include a temporal ID (TemporalId). The maximum value of TemporalId may not be larger than the maximum number of temporal sublayers represented by the information on the maximum number of temporal sublayers. That is, the maximum value of TemporalId may be smaller than or equal to the maximum number of temporal sublayers.

In the above-described embodiments, the methods are explained based on flowcharts by means of a series of steps or blocks, but the present disclosure is not limited to the order of steps, and a certain step may be performed in order or step different from that described above, or concurrently with another step. Further, it may be understood by a person having ordinary skill in the art that the steps shown in a flowchart are not exclusive, and that another step may be incorporated or one or more steps of the flowchart may be removed without affecting the scope of the present disclosure.

The above-described methods according to the present disclosure may be implemented as a software form, and an encoding apparatus and/or decoding apparatus according to the disclosure may be included in a device for image processing, such as, a TV, a computer, a smartphone, a set-top box, a display device or the like.

When embodiments in the present disclosure are embodied by software, the above-described methods may be embodied as modules (processes, functions and the like) to perform the above-described functions. The modules may be stored in a memory and may be executed by a processor. The memory may be inside or outside the processor and may be connected to the processor in various well-known manners. The processor may include an application-specific integrated circuit (ASIC), other chipset, logic circuit, and/or a data processing device. The memory may include a read-only memory (ROM), a random access memory (RAM), a flash memory, a memory card, a storage medium, and/or other storage device. That is, embodiments described in the present disclosure may be embodied and performed on a processor, a microprocessor, a controller or a chip. For example, function parts shown in each drawing may be embodied and performed on a computer, a processor, a microprocessor, a controller or a chip. In this case, information for implementation (e.g., information on instructions) or an algorithm may be stored in a digital storage medium.

Furthermore, the decoding apparatus and the encoding apparatus to which this document is applied may be included in a multimedia broadcasting transmission and reception device, a mobile communication terminal, a home cinema video device, a digital cinema video device, a camera for monitoring, a video dialogue device, a real-time communication device such as video communication, a mobile streaming device, a storage medium, a camcorder, a video on-demand (VoD) service provision device, an over the top (OTT) video device, an Internet streaming service provision device, a three-dimensional (3D) video device, a virtual reality (VR) device, an augmented reality (AR) device, a video telephony device, transportation means terminal (e.g., a vehicle (including autonomous vehicle) terminal, an aircraft terminal, and a vessel terminal), and a medical video device, and may be used to process a video signal or a data signal. For example, the over the top (OTT) video device may include a game console, a Blueray player, Internet access TV, a home theater system, a smartphone, a tablet PC, and a digital video recorder (DVR).

Furthermore, the processing method to which this document is applied may be produced in the form of a program executed by a computer, and may be stored in a computer-readable recording medium. Multimedia data having a data structure according to this document may also be stored in a computer-readable recording medium. The computer-readable recording medium includes all types of storage devices in which computer-readable data is stored. The computer-readable recording medium may include Blueray disk (BD), a universal serial bus (USB), a ROM, a PROM, an EPROM, an EEPROM, a RAM, a CD-ROM, a magnetic tape, a floppy disk, and an optical data storage device, for example. Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication networks.

Furthermore, an embodiment of this document may be implemented as a computer program product using program code. The program code may be performed by a computer according to an embodiment of this document. The program code may be stored on a carrier readable by a computer.

Figure 12:
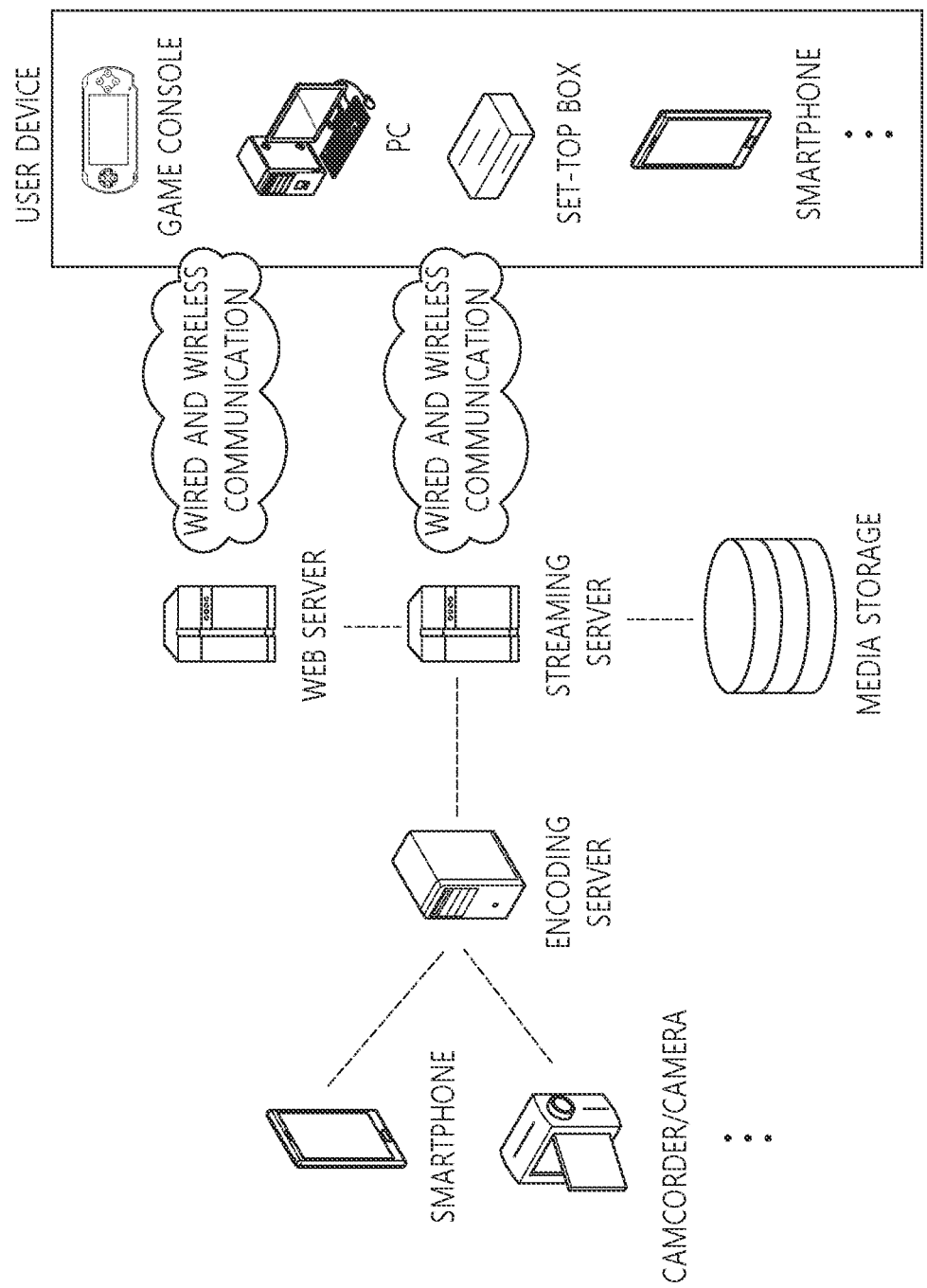
FIG. 12 illustrates an example of a content streaming system to which embodiments disclosed in the present document are applicable.

FIG. 12 illustrates an example of a content streaming system to which embodiments disclosed in the present document are applicable.

Referring to FIG. 12, the content streaming system to which the embodiments of the present document are applied may basically include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present document is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting, terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

The appended claims of the present disclosure may be combined in various ways. For example, technical features of method claims of the present disclosure may be combined to be implemented as an apparatus, and technical features of apparatus claims of the present disclosure may be combined to be implemented as a method. Also, technical features of method claims and technical features of apparatus claims of the present disclosure may be combined to be implemented as an apparatus, and technical features of method claims and technical features of apparatus claims of the present disclosure may be combined to be implemented as a method.

What is claimed is:

1. An image decoding method performed by a decoding apparatus, the method comprising:
obtaining image information from a bitstream, wherein the image information comprises information related to temporal sub-layers and information related to a target output layer set (OLS);
generating prediction samples of a current block by performing prediction on the current block based on the information related to the temporal sub-layers; and
generating a reconstructed picture based on the prediction samples, wherein the image information comprises a video parameter set (VPS) and sequence parameter set (SPS),
wherein the information related to the temporal sub-layers comprises the information on a maximum number of the temporal sub-layers,
wherein the information related to the target OLS comprises the number of the layers comprised in the target OLS,
wherein the information on the maximum number of the temporal sub-layers is determined based on information transmitted through the VPS or the SPS, and
wherein whether the information on the maximum number of the temporal sub-layers is information based on the VPS or information based on the SPS is determined based on the number of the layers comprised in the target OLS, and
wherein based on the number of the layers comprised in the target OLS being equal to 1, the information on the maximum number of the temporal sub-layers is the information based on the SPS.

2. The method of claim 1, wherein based on the number of the layers comprised in the target OLS being larger than 1, the information on the maximum number of the temporal sub-layers is the information based on the VPS.

3. The method of claim 1, wherein a value of the information on the maximum number of the temporal sub-layers plus 1 is equal to the number of the maximum number of the temporal sub-layers.

4. The method of claim 1, wherein the information on the maximum number of the temporal sub-layers is derived based on the following formula:
   Max TemporalSublayersMinus1=(NumLayersInOls[TargetOlsIdx]>1)? vps_max_sublayers_minus1:sps_max_sublayers_minus1,
   wherein the MaxTemporalSublayersMinus1 represents the information on the maximum number of the temporal sub-layers, the NumLayersInOls [TargetOlsIdx] represents the number of the layers comprised in the target OLS, the vps_max_sublayers_minus1 represents the maximum number of the temporal sub-layers comprised in the VPS, and the sps_max_sublayers_minus1 represents the maximum number of the temporal sub-layers comprised in the SPS.

5. The method of claim 1, wherein the information related to temporal sub-layers comprises temporal ID (TemporalId),
   wherein a maximum value of the TemporalId is not larger than the maximum number of the temporal sub-layers represented by the information on the maximum number of the temporal sub-layers.

6. An image encoding method performed by an encoding apparatus, the method comprising:
   generating information related to temporal sub-layers;
   generating information related to a target output layer set (OLS); and
   encoding image information comprising the information related to the temporal sub-layers and the information related to the OLS;
   wherein the image information comprises a video parameter set (VPS) and sequence parameter set (SPS),
   wherein the information related to the temporal sub-layers comprises the information on a maximum number of the temporal sub-layers,
   wherein the information related to the target OLS comprises the number of the layers comprised in the target OLS,
   wherein the information on the maximum number of the temporal sub-layers is comprised in the VPS or the SPS, and
   wherein whether the information on the maximum number of the temporal sub-layers is information based on the VPS or information based on the SPS is determined based on the number of the layers comprised in the target OLS, and
   wherein based on the number of the layers comprised in the target OLS being equal to 1, the information on the maximum number of the temporal sub-layers is the information based on the SPS.

7. The method of claim 6, wherein based on the number of the layers comprised in the target OLS being larger than 1, the information on the maximum number of the temporal sub-layers is the information based on the VPS.

8. The method of claim 6, wherein a value of the information on the maximum number of the temporal sub-layers plus 1 is equal to the number of the maximum number of the temporal sub-layers.

9. The method of claim 6, wherein the information on the maximum number of the temporal sub-layers is derived based on the following formula:
   Max TemporalSublayersMinus1=(NumLayersInOls [TargetOlsIdx]>1)? vps_max_sublayers_minus1:sps_max_sublayers_minus1,
   wherein the MaxTemporalSublayersMinus1 represents the information on the maximum number of the temporal sub-layers, the NumLayersInOls[TargetOlsIdx] represents the number of the layers comprised in the target OLS, the vps_max_sublayers_minus1 represents the maximum number of the temporal sub-layers comprised in the VPS, and the sps_max_sublayers_minus1 represents the maximum number of the temporal sub-layers comprised in the SPS.

10. The method of claim 6, wherein the information related to temporal sub-layers comprises temporal ID (TemporalId),
    wherein a maximum value of the TemporalId is not larger than the maximum number of the temporal sub-layers represented by the information on the maximum number of the temporal sub-layers.

11. A non-transitory computer-readable digital storage medium storing bitstream causing a decoding apparatus to perform an image decoding method, the method comprising:
    obtaining image information from a bitstream, wherein the image information comprises information related to temporal sub-layers and information related to a target output layer set (OLS);
    generating prediction samples of a current block by performing prediction on the current block based on the information related to the temporal sub-layers; and
    generating a reconstructed picture based on the prediction samples,
    wherein the image information comprises a video parameter set (VPS) and sequence parameter set (SPS),
    wherein the information related to the temporal sub-layers comprises the information on a maximum number of the temporal sub-layers,
    wherein the information related to the target OLS comprises the number of the layers comprised in the target OLS,
    wherein the information on the maximum number of the temporal sub-layers is determined based on information transmitted through the VPS or the SPS, and
    wherein whether the information on the maximum number of the temporal sub-layers is information based on the VPS or information based on the SPS is determined based on the number of the layers comprised in the target OLS, and wherein based on the number of the layers comprised in the target OLS being equal to 1, the information on the maximum number of the temporal sub-layers is the information based on the SPS.

12. The non-transitory computer-readable digital storage medium of claim 11, wherein based on the number of the layers comprised in the target OLS being larger than 1, the information on the maximum number of the temporal sub-layers is the information based on the VPS.

\* \* \* \* \*